US011188776B2

(12) United States Patent
Blais-Morin et al.

(10) Patent No.: US 11,188,776 B2
(45) Date of Patent: Nov. 30, 2021

(54) AUTOMATED LICENSE PLATE RECOGNITION SYSTEM AND RELATED METHOD

(71) Applicant: GENETEC INC., St-Laurent (CA)

(72) Inventors: Louis-Antoine Blais-Morin, Montréal (CA); Pablo Agustin Cassani, Montreal (CA); André Bleau, Dollard-des-Ormeaux (CA)

(*) Notice: Subject to any disclaimer, the term of this patent is extended or adjusted under 35 U.S.C. 154(b) by 0 days.

(21) Appl. No.: 16/987,022

(22) Filed: Aug. 6, 2020

(65) Prior Publication Data

US 2021/0124966 A1  Apr. 29, 2021

Related U.S. Application Data

(60) Provisional application No. 62/926,462, filed on Oct. 26, 2019.

(51) Int. Cl.
*G06T 7/70* (2017.01)
*G06K 9/32* (2006.01)
(Continued)

(52) U.S. Cl.
CPC ............ *G06K 9/325* (2013.01); *G06K 9/6202* (2013.01); *G06T 7/70* (2017.01); *G06T 7/97* (2017.01);
(Continued)

(58) Field of Classification Search
CPC .. G06K 9/325; G06K 9/6202; G06K 2209/15; G06T 7/97; G06T 7/70; G08G 1/0133
See application file for complete search history.

(56) References Cited

U.S. PATENT DOCUMENTS 5,381,155 A * 1/1995 Gerber ................... G08G 1/017
340/936
5,757,286 A 5/1998 Jonsson et al.
(Continued)

FOREIGN PATENT DOCUMENTS

CN 203165216 U 8/2013
CN 105182320 A 12/2015
(Continued)

OTHER PUBLICATIONS

"Scale-invariant feature transform", Wikipedia, published at least as early as Nov. 26, 2017, but enclosed printed copy is from Dec. 5, 2017, 16 pages, can be accessed at https://en.wikipedia.org/wiki/Scale-invariant_feature_transform.
(Continued)

*Primary Examiner* — Shaghayegh Azima
(74) *Attorney, Agent, or Firm* — Anglehart et al.

(57) ABSTRACT

Systems, methods, devices and computer readable media for determining a geographical location of a license plate are described herein. A first image of a license plate is acquired by a first image acquisition device of a camera unit and a second image of the license plate is acquired by a second image acquisition device of the camera unit. A three-dimensional position of the license plate relative to the camera unit is determined based on stereoscopic image processing of the first image and the second image. A geographical location of the camera unit is obtained. A geographical location of the license plate is determined from the three-dimensional position of the license plate relative to the camera unit and the geographical location of the camera unit. Other systems, methods, devices and computer readable media for detecting a license plate and identifying a license plate are described herein.

20 Claims, 18 Drawing Sheets

(51) Int. Cl.
*G06K 9/62* (2006.01)
*G08G 1/133* (2006.01)
*G06T 7/00* (2017.01)

(52) U.S. Cl.
CPC ......... *G08G 1/133* (2013.01); *G06K 2209/15* (2013.01)

(56) References Cited

U.S. PATENT DOCUMENTS

| | | | |
|---|---|---|---|
| 6,404,902 B1 * | 6/2002 | Takano | G06K 9/209 382/104 |
| 6,650,765 B1 | 11/2003 | Alves | |
| 7,982,634 B2 * | 7/2011 | Arrighetti | G08G 1/04 340/937 |
| 8,526,677 B1 * | 9/2013 | Crichton | G06K 9/00691 382/103 |
| 9,087,380 B2 | 7/2015 | Lock | |
| 9,142,010 B2 | 9/2015 | Watts | |
| 9,270,875 B2 | 2/2016 | Brisedoux et al. | |
| 9,927,253 B2 | 3/2018 | Clynne et al. | |
| 10,755,571 B1 * | 8/2020 | Eather | G08G 1/142 |
| 2010/0131197 A1 * | 5/2010 | Zhang | G01C 21/36 701/533 |
| 2010/0151213 A1 | 6/2010 | Smithson et al. | |
| 2012/0242809 A1 | 9/2012 | White et al. | |
| 2013/0162799 A1 | 6/2013 | Hanna et al. | |
| 2013/0299517 A1 | 9/2013 | Ciavarella et al. | |
| 2015/0163390 A1 | 6/2015 | Lee et al. | |
| 2016/0232410 A1 * | 8/2016 | Kelly | G08G 1/054 |
| 2016/0241839 A1 | 8/2016 | Crona | |
| 2016/0300354 A1 | 10/2016 | Fetzer et al. | |
| 2017/0075888 A1 * | 3/2017 | Ekin | G06F 16/51 |
| 2017/0148102 A1 * | 5/2017 | Franke | G06Q 30/0278 |
| 2017/0286794 A1 | 10/2017 | Aoyama et al. | |
| 2018/0137368 A1 | 5/2018 | Newman | |
| 2018/0268687 A1 * | 9/2018 | Che | G06K 9/00785 |
| 2019/0166355 A1 | 5/2019 | Banks et al. | |
| 2019/0244045 A1 | 8/2019 | Blais-Morin et al. | |
| 2019/0287297 A1 * | 9/2019 | Abhiram | G06T 7/246 |
| 2019/0318622 A1 | 10/2019 | Shideler et al. | |
| 2020/0311435 A1 * | 10/2020 | Kucharski | G05D 1/12 |
| 2020/0327343 A1 * | 10/2020 | Lund | G06T 7/70 |
| 2021/0124966 A1 * | 4/2021 | Blais-Morin | G06T 7/70 |

FOREIGN PATENT DOCUMENTS

| | | |
|---|---|---|
| CN | 105844266 A | 8/2016 |
| CN | 106682611 A | 5/2017 |
| CN | 107195004 A | 9/2017 |
| CN | 108022429 A | 5/2018 |
| CN | 207380911 U | 5/2018 |
| CN | 109544707 A | 3/2019 |
| CN | 110264729 A | 9/2019 |
| CN | 110285793 A | 9/2019 |
| CN | 110322702 A | 10/2019 |
| CN | 110458897 A | 11/2019 |
| CN | 209625442 U | 11/2019 |
| CN | 110930716 A | 3/2020 |
| JP | 2007047876 A | 2/2007 |
| KR | 20050020350 A | 3/2005 |
| KR | 100541865 B1 | 1/2006 |
| KR | 20120000373 A | 1/2012 |
| KR | 101151523 B1 | 5/2012 |
| KR | 20140000402 A | 1/2014 |
| KR | 101392357 B1 | 5/2014 |
| KR | 101794308 B1 | 12/2017 |
| KR | 101828558 B1 | 2/2018 |
| WO | 2011/044149 A1 | 4/2011 |
| WO | 2017/059527 A1 | 4/2017 |
| WO | 2018/049514 A1 | 3/2018 |
| WO | 2019/066770 A1 | 4/2019 |

OTHER PUBLICATIONS

"Optical flow", Wikipedia, published at least as early as Sep. 29, 2017, but enclosed printed copy is from Dec. 5, 2017, 5 pages, can be accessed at https://en.wikipedia.org/wiki/Optical_flow.

Pixim Eclipse Ambient Light Rejection Camera Product Brief, published by Pixim, Published in Sep. 2008, 2 pages.

International application No. PCT/CA2020/051075 search report dated Nov. 23, 2020.

International application No. PCT/CA2020/051075 Written Opinion dated Nov. 23, 2020.

Abdelmoghit Zaaran et al., "Distance measurement system for autonomous vehicles using stereo camera", Array. vol. 5, Mar. 2020, 100016.

Related U.S. Appl. No. 15/891,747 (publication No. 2019/0244045A1) Office Action dated Nov. 22, 2019.

Related U.S. Appl. No. 15/891,747 (publication No. 2019/0244045A1) Notice of Allowance dated Feb. 27, 2020.

Henrik Andreasson, et al. "Vision-based People Detection Utilizing Reflective Vests for Autonomous Transportation Applications", Conference: IROS Workshop on Metrics and Methodologies for Autonomous Robot Teams in Logistics (MMART-LOG), At San Francisco, US A, Sep. 2011, 6 pages.

Morookian, John Michael et al. "Ambient-Light-Canceling Camera US ing Subtraction of Frames", NASA Tech Briefs, May 2004, p. 14-15.

Galoppo, Nico, et al. "Cl_intel_motion_estimation", Intel, published Mar. 18, 2016, but enclosed printed copy is from Aug. 17, 2020, 5 pages, Can be accessed at https://www.khronos.org/registry/OpenCL/extensions/intel/cl_intel_motion_estimation.txt.

Maxim Yurevich Shevtsov, "Introduction to Motion Estimation Extension for OpenCL", Intel, Published: Nov. 25, 2013, but enclosed printed copy is from Aug. 17, 2020, 9 pages, Can be accessed at https://software.intel.com/content/www/US/en/develop/articles/intro-to-motion-estimation-extension-for-opencl.html.

Danian Zheng et al. An efficient method of license plate location, Pattern Recognition Letters 26(15):2431-2438—Nov. 2005.

Christos-Nikolaos Anagnostopoulos et al. "A License Plate-Recognition Algorithm for Intelligent Transportation System Applications", IEEE Transactions on Intelligent Transportation Systems, vol. 7(3), Sep. 2006.

\* cited by examiner

AUTOMATED LICENSE PLATE RECOGNITION SYSTEM AND RELATED METHOD

CROSS-REFERENCE TO RELATED APPLICATIONS

The present application claims priority under 35 U.S.C. 119(e) of U.S. Provisional Patent Application bearing Ser. No. 62/926,462, filed on Oct. 26, 2019, the contents of which are hereby incorporated by reference.

TECHNICAL FIELD

The present disclosure relates generally to the field of automated license plate recognition, and, more particularly, to systems and methods for determining a geographical location of a license plate and to systems and methods for detecting a license plate and/or identifying a license plate number.

BACKGROUND

An automated license plate recognition (ALPR) system may take a digital photo of a vehicle to acquire a digital image, and may then search for the license plate in the digital image. The ALPR system may then further process the digital image in order to identify the license plate number on the license plate.

Existing ALPR systems may have various shortcomings. For example, in the context of parking enforcement, a patrol vehicle may be equipped with an ALPR system in order to read a license plate number and to determine if a parking violation has occurred. The patrol vehicle may be equipped with a global positioning system (GPS) unit such that an approximate location of the patrol vehicle can be known when capturing an image of a license plates and/or when issuing a parking violation. However, such systems do not provide an accurate geographical location of the license plate and/or of the vehicle with said license plate. Existing ALPR systems may have other shortcomings, such as difficulties with detecting the location of the license plate in an image and/or identifying the license plate number in certain circumstances.

As such, there is room for improvement.

SUMMARY

The present disclosure is generally drawn to systems, methods, devices, and computer readable media for determining a geographical location of a license plate and to systems, methods, devices, and computer readable media for detecting a license plate and/or identifying a license plate number.

In one aspect, there is provided an automated license plate recognition system. The automated license plate recognition system comprises a camera unit. The camera unit comprises a first image acquisition device for acquiring at least a first image of a license plate and a second image acquisition device for acquiring at least a second image of the license plate. The automated license plate recognition system further comprises at least one processing unit and at least one non-transitory computer-readable memory having stored thereon program instructions. The program instructions are executable by the at least one processing unit for: obtaining the first image and the second image of the license plate; determining a three-dimensional position of the license plate relative to the camera unit based on stereoscopic image processing of the first image and the second image; obtaining a geographical location of the camera unit; determining a geographical location of the license plate from the three-dimensional position of the license plate relative to the camera unit and the geographical location of the camera unit; and outputting the geographical location of the license plate.

In another aspect, there is provided a computer-implemented method for determining a geographical location of a license plate. The method comprises: obtaining a first image and a second image of a license plate, the first image acquired by a first image acquisition device of a camera unit and the second image acquired by a second image acquisition device of the camera unit; determining a three-dimensional position of the license plate relative to the camera unit based on stereoscopic image processing of the first image and the second image; obtaining a geographical location of the camera unit; determining a geographical location of the license plate from the three-dimensional position of the license plate relative to the camera unit and the geographical location of the camera unit; and outputting the geographical location of the license plate.

In some embodiments, determining the three-dimensional position of the license plate comprises: locating the license plate in the first image and the second image; and determining the three-dimensional position of the license plate based on the license plate located in the first image and the second image.

In some embodiments, locating the license plate in the first image and the second image comprises: identifying pixel coordinates of the license plate in the first image and the second image; and wherein determining the three-dimensional position of the license plate comprises: determining a difference of the pixel coordinates of the license plate in the first image and the second image; and determining the three-dimensional position of the license plate based on the difference of the pixel coordinates and configuration information of the first image acquisition device and the second image acquisition device.

In some embodiments, locating the license plate in the first image and the second image comprises: identifying pixel coordinates of the license plate in the first image and the second image; and wherein determining the three-dimensional position of the license comprises: determining a pixel shift of the license plate between the first image and the second image based on a difference of the pixel coordinates of the license plate in the first image and the second image; and determining the three-dimensional position of the license plate based on the pixel shift and configuration information of the first image acquisition device and the second image acquisition device.

In some embodiments, identifying the pixel coordinates of the license plate in the first image and the second image comprises locating the pixel coordinates of at least one corner of the license plate in the first image and the second image.

In some embodiments, obtaining the geographical location of the camera unit comprises determining the geographical location of the camera unit based on at least one of: real-time kinematic processing of GPS signals received at one or more antennas and an orientation and a position of the camera unit relative to the one or more antennas, a previous known geographical location of the camera unit and dead-reckoning information, and interpolation from two geographical coordinates indicative of the geographical location of the camera unit.

In some embodiments, the system further comprising a positioning unit for determining the geographical location of the camera unit, and wherein obtaining the geographical location of the camera unit comprises receiving the geographical location of the camera unit from the positioning unit.

In some embodiments, the geographical location of the camera unit is determined based on real-time kinematic processing of GPS signals received at one or more antennas connected to the positioning unit and an orientation and a position of the camera unit relative to the one or more antennas.

In some embodiments, obtaining the geographical location of the camera unit comprises determining the geographical location of the camera unit based on real-time kinematic processing of GPS signals received at one or more antennas and an orientation and a position of the camera unit relative to the one or more antennas.

In some embodiments, the geographical location of the camera unit is determined based on a previous known geographical location of the camera unit and dead-reckoning information.

In some embodiments, obtaining the geographical location of the camera unit comprises determining the geographical location of the camera unit based on a previous known geographical location of the camera unit and dead-reckoning information.

In some embodiments, the dead-reckoning information comprises one or more of: odometer information, gyroscopic information, acceleration information and wheel rotation information.

In some embodiments, the geographical location of the camera unit is determined based on interpolation from two geographical coordinates indicative of the geographical location of camera unit.

In some embodiments, obtaining the geographical location of the camera unit comprises determining the geographical location of the camera unit based on interpolation from two geographical coordinates indicative of the geographical location of camera unit.

In some embodiments, the geographical location of the camera unit comprises latitude and longitude coordinates of the camera unit, the three-dimensional position of the license plate relative to the camera unit comprises Cartesian coordinates representing position values of the license plate relative to the camera unit, and wherein determining the geographical location of the license plate comprises transforming the latitude and longitude coordinates of the camera unit with the Cartesian coordinates representing position values of the license plate relative to the camera unit.

In some embodiments, the first image acquisition device is a first monochrome camera, the second image acquisition device is a second monochrome camera, the first camera and the second camera having substantially a same wavelength sensitivity, the first image is a first monochrome image, and the second image is a second monochrome image.

In some embodiments, the first image acquisition device is a first infrared camera, the second image acquisition device is a second infrared camera, the first image is a first monochrome image, and the second image is a second monochrome image.

In some embodiments, the first image acquisition device is a color camera, the second image acquisition device is an infrared camera, the first image is a color image, and the second image is a monochrome image.

In some embodiments, the camera unit further comprises the at least one processing unit and the at least one non-transitory computer-readable memory.

In some embodiments, the system further comprises an external computing device in communication with the camera unit, the external computing device comprising the at least one processing unit and the at least one non-transitory computer-readable memory.

In some embodiments, the program instructions are further executable by the at least one processing unit for: determining an exposure quality level of the license plate in the first image and the second image; selecting one of the first image and the second image based on the exposure quality level of the license plate in the first image and the second image; and identifying the license plate number in the selected one of the first image and the second image.

In some embodiments, the method further comprises: determining an exposure quality level of the license plate in the first image and the second image; selecting one of the first image and the second image based on the exposure quality level of the license plate in the first image and the second image; and identifying the license plate number in the selected one of the first image and the second image.

In yet another aspect, there is provided an automated license plate recognition system. The automated license plate recognition system comprises a camera unit. The camera unit comprises a first image acquisition device for acquiring at least a first image of a license plate having a license plate number and a second image acquisition device for acquiring at least a second image of the license plate with a different exposure level from the first image. The automated license plate recognition system further comprises at least one processing unit and at least one non-transitory computer-readable memory having stored thereon program instructions. The program instructions are executable by the at least one processing unit for: obtaining a plurality of images of the license plate comprising at least the first image and the second image of the license plate; determining a confidence measure that the license plate number is identifiable for each one of the plurality of images; selecting one or more images from the plurality images based on the confidence measure for each one of the plurality of images; and identifying the license plate number in the one or more images selected from the plurality images.

In a further aspect, there is provided a computer-implemented method for identifying a license plate number of a license plate. The method comprises: obtaining a plurality of images of a license plate comprising at least a first image of the license plate and a second image of the license plate, the first image acquired by a first image acquisition device and the second image acquired by a second image acquisition device; determining a confidence measure that the license plate number is identifiable for each one of the plurality of images; selecting one or more images from the plurality images based on the confidence measure for each one of the plurality of images; and identifying the license plate number in the one or more images selected from the plurality images.

In some embodiments, the first image acquisition device is configured with a first exposure setting suitable for capturing license plates that are substantially retroreflective and the second image acquisition device is configured with a second exposure setting suitable for capturing license plates that are substantially non-retroreflective, the first exposure setting being lower than the second exposure setting.

In some embodiments, the program instructions are further executable by the at least one processing unit for locating the license plate in first image and the second image; and wherein determining the confidence measure comprises determining an exposure quality level of the license plate located in the first image and the second image; and wherein selecting the one or more images comprises selecting at least one of the first image and the second image based on the exposure quality level of the license plate located in the first image and the second image.

In some embodiments, the method further comprises locating the license plate in first image and the second image; and wherein determining the confidence measure comprises determining an exposure quality level of the license plate located in the first image and the second image; and wherein selecting the one or more images comprises selecting one of the first image and the second image based on the exposure quality level of the license plate located in the first image and the second image.

In some embodiments, selecting the one or more images comprises: selecting the first image when the exposure quality level of the license plate located in the first image is better than the exposure quality level of the license plate located in the second image; or selecting the second image when the exposure quality level of the license plate located in the second image is better than the exposure quality level of the license plate located in the first image; and wherein identifying the license plate number comprises identifying the license plate number in the first image when selected and identifying the license plate number in the second image when selected.

In some embodiments, determining the confidence measure comprises determining an exposure quality level for the license plate located in each one of the plurality of images; and wherein selecting the one or more images comprises selecting one or more of the plurality of images based on the exposure quality level for each one of the plurality of images.

In some embodiments, determining the confidence measure comprises determining a confidence score for each one of the plurality of images; and wherein selecting the one or more images comprises selecting one or more of the plurality of images based on the confidence score for each one of the plurality of images.

In some embodiments, the plurality of images comprises a third image generated from the first image and the second image.

In some embodiments, obtaining the plurality of images comprises generating the third image.

In some embodiments, the plurality of images comprises a high dynamic range image of the license plate generated from the first image and the second image.

In some embodiments, the plurality of images comprises a high-resolution image of the license plate generated from the first image and the second image using a super-resolution algorithm.

In some embodiments, the plurality of images comprises a low-noise image of the license plate generated from the first image and the second image by averaging pixel values of first image and the second image.

In some embodiments, the plurality of images comprises a compound image of the license plate generated from the first image and the second image to at least in part remove ambient light.

In some embodiments, the first image acquisition device is configured with a first focal distance suitable for capturing license plates at a first distance range, the second image acquisition device is configured with a second focal distance suitable for capturing license plates at a second distance range.

Any of the above features may be used together in any suitable combination.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
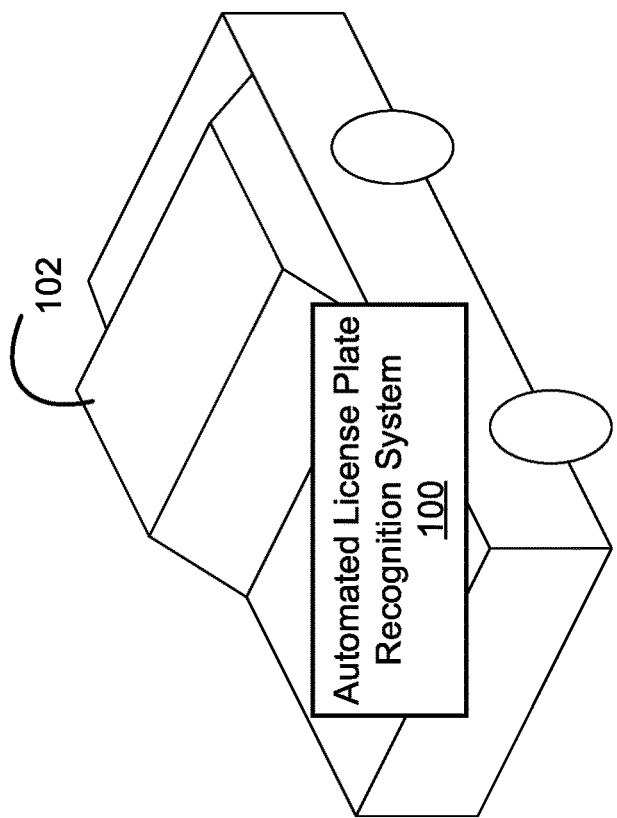
FIG. 1 is a block diagram illustrating an environment with an automated license plate recognition system, in accordance with one or more embodiments.
Figure 1:
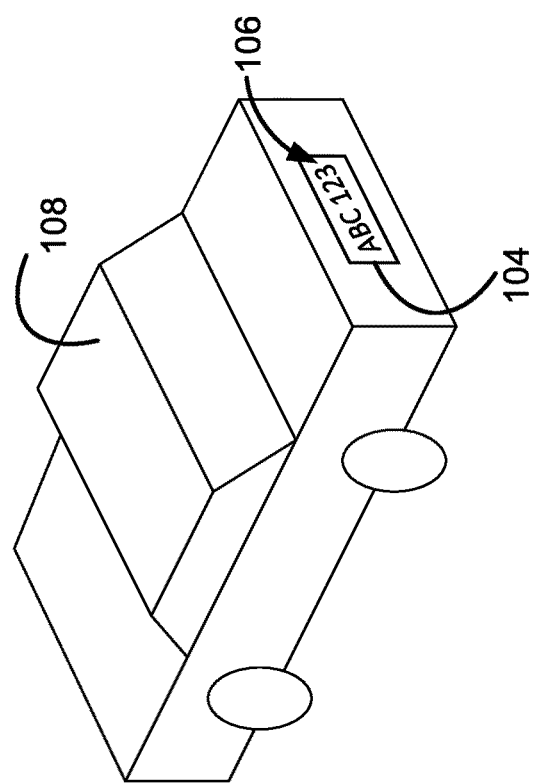

With reference to FIG. 1, there is illustrated an example of an environment with an automated license plate recognition (ALPR) system 100. In some embodiments, the APLR system 100 is configured to detect a license plate 104 of a vehicle 108 and/or identify a license plate number 106 of the license plate 104. The license plate number 106 may comprise any suitable combination of alphanumerical characters, and is not limited to numbers. The license plate number 106 may be referred to as a "vehicle registration identifier". In some embodiments, the APLR system 100 is configured to determine a geographical location of the license plate 104. In this example, the ALPR system 100 is equipped on a vehicle 102, such as a patrol vehicle, which may be used with vehicle parking enforcement and/or vehicle speed enforcement. In such an environment it may be desirable to know the location of the license plate 104 (or vehicle 108) when capturing images of the license plate 104 (or vehicle 108) and/or when issuing an infraction. The environment in which the ALPR system 100 can be used may vary depending on practical implementations. For example, the ALPR system 100 may used in environments where it is not equipped in or on a patrol vehicle 102.

Figure 2:
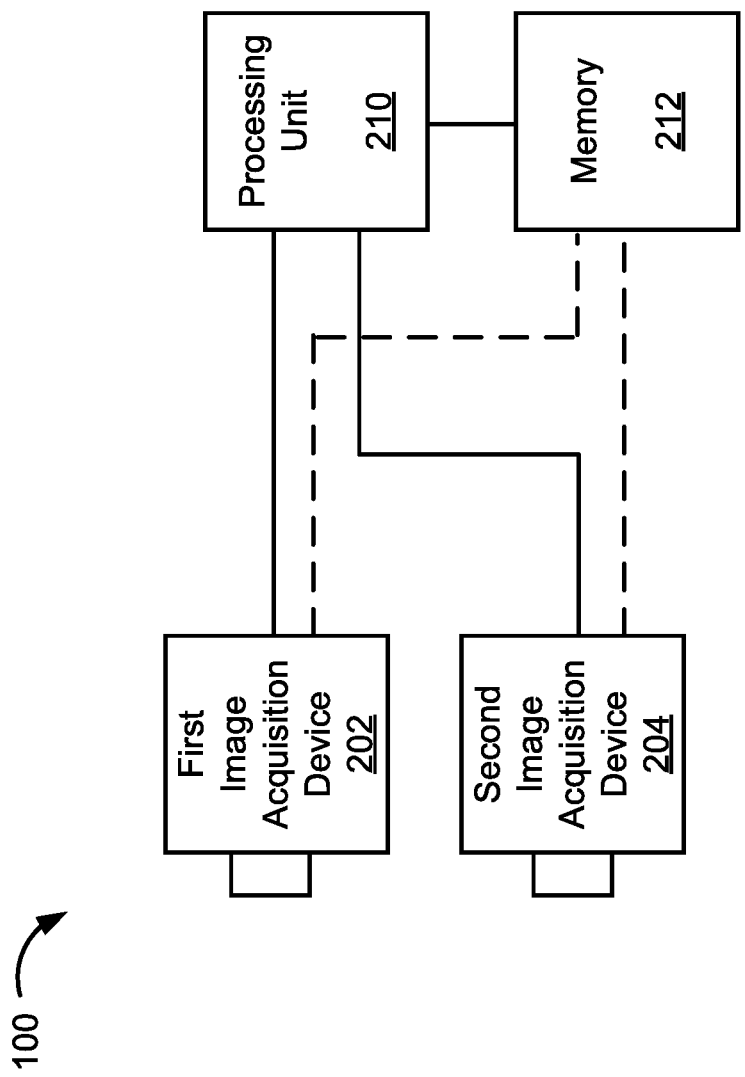
FIG. 2 is a block diagram illustrating an automated license plate recognition system, in accordance with one or more embodiments.

With reference to FIG. 2, the APLR system 100 comprises a first image acquisition device 202, a second image acquisition device 204, at least one processing unit 210, and at least one memory 212. The memory 212 has stored thereon program instructions executable by the processing unit 210 for determining a geographical location of the license plate 104 and/or for detecting the license plate 104 and/or determining the license plate number 106. The image acquisition devices 202, 204 are for acquiring digital images. The image acquisition devices 202, 204 may be any suitable device for acquiring digital images, e.g., using a sensor such as a charged couple device (CCD) sensor or a complementary metal-oxide-semiconductor (CMOS) sensor. When the image acquisitions devices 202, 204 are actuated to take digital photography, an aperture of each device 202, 204 opens and the incoming light rays are detected using a sensor. The image acquisitions devices 202, 204 convert the incoming light rays into a digital image. In the illustrated example, the processing unit 210 is connected to the image acquisitions devices 202, 204 and the memory 212. The processing unit 210 may be configured to control the operation of the image acquisitions devices 202, 204 in order to acquire digital images, which may be stored in the memory 212. The memory 212 may have stored thereon program instructions executable by the processing unit 210 for controlling the image acquisitions devices 202, 204.

In some embodiments, one or more additional processing units or controllers (not shown) and/or additional memory (not shown), separate from the processing unit 210 and/or the memory 212 shown in FIG. 2, may be provided for the purposes of controlling operation of the image acquisitions devices 202, 204. The additional memory may be used for storing the acquired digital images. These additional processing unit(s) and/or memory may be part of the image acquisitions devices 202, 204, or separate therefrom. In some embodiments, the image acquisitions devices 202, 204 may be connected to the memory 212 and the image acquisitions devices 202, 204 may store the acquired digital images in the memory 212. In various embodiments described herein below, the first image acquisition device 202 is a first digital camera, which is referred to as a "first camera", and the second image acquisition device 204 is a second digital camera, which is referred to as a "second camera"; however any suitable image acquisition devices could be used in place of the digital cameras.

Figure 3:
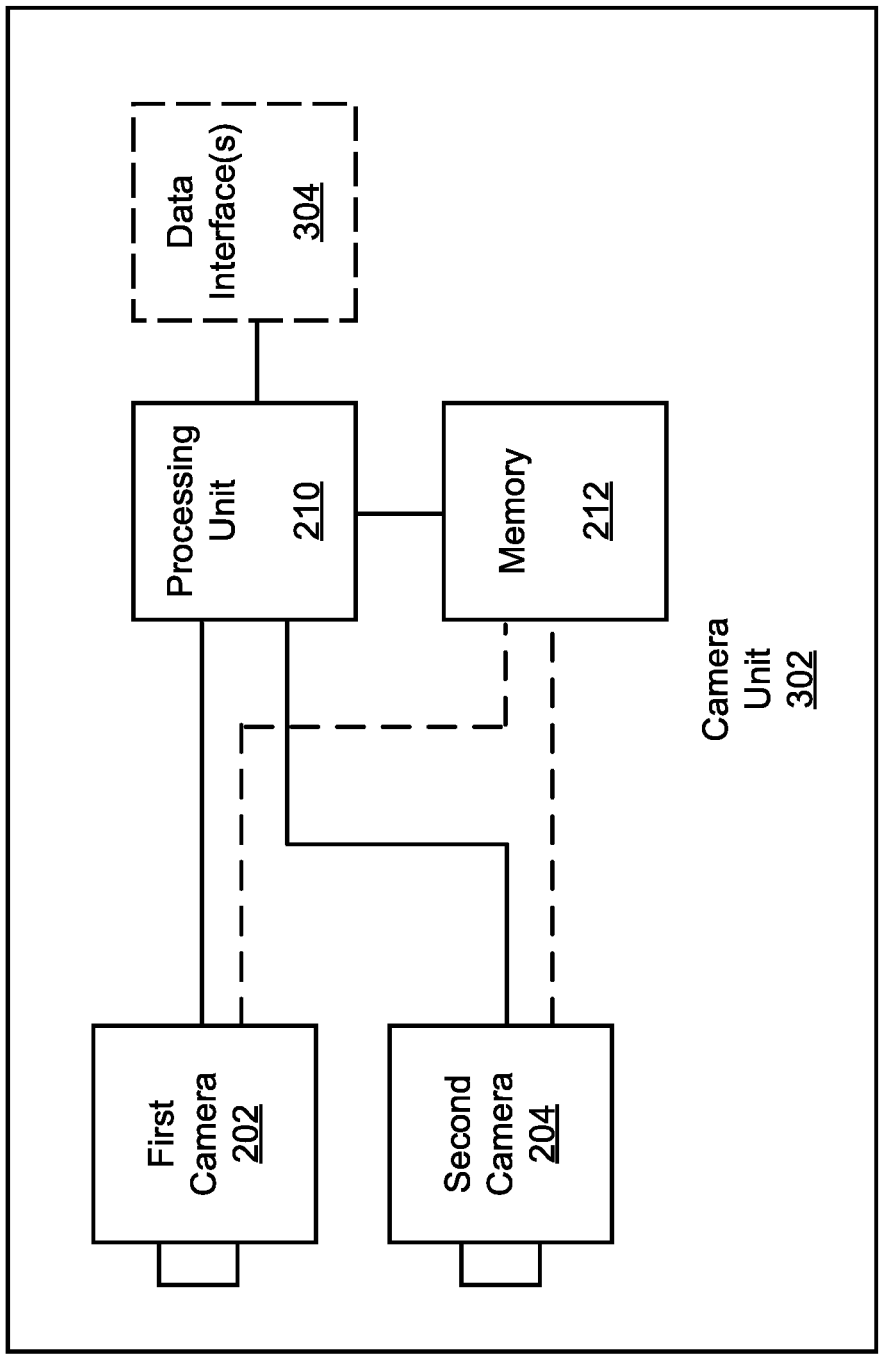
FIG. 3 is a block diagram of an example of the automated license plate recognition system with a camera unit, in accordance with one or more embodiments.

FIG. 3 illustrates an example of the APLR system 100, where a camera unit 302 comprises the first camera 202, the second camera 204, the processing unit 210, and the memory 212. The camera unit 302 is any suitable device, hardware and/or structure with the first camera 202 and the second camera 204. In some embodiments, the camera unit 302 is a mechanical structure that has the cameras 202, 204 mounted thereon. The cameras 202, 204 may be mounted close to one another in a single integrated camera unit 302. In some embodiments, the camera unit 302 comprises a housing enclosing the first camera 202, the second camera 204, the processing unit 210, and the memory 212. The camera unit 302 may allow for the cameras 202, 204 to be provided in a known spaced relationship with each other within the housing and/or on a mechanical structure that they may be mounted thereon. The cameras 202, 204 may have substantially the same (i.e., the same or similar) characteristics (e.g., one or more of: pixel count, light/wavelength sensitivity, same lenses, etc.). The lenses of the cameras 202, 204 have a similar, but not identical fields of view, due to the spaced relationship. The camera unit 302 may comprises any other suitable components (e.g., enclosed in the housing) for implementing the functionality of the APLR system 100 described herein.

The camera unit 302 may comprise one or more data interfaces 304 for interfacing with one or more external devices, systems, and/or networks. The data interface(s) 304 may comprise one or more wired and/or wireless data interfaces. For example, the camera unit 302 via the data interface(s) 304 may be connected to and/or may be able to communicate with a mobile computing device (e.g., a mobile phone, a smart phone, a tablet, a laptop computer, a smart watch, or the like). In this case, the mobile computing device may be used by an operator of the patrol vehicle 102 in order to interact and/or control the operation of the APLR system 100. By way of another example, the camera unit 302 via the data interface(s) 304 may be connected to and/or may be able to communicate with a remote computing device (e.g., one or more computers, a server, a server cluster, a mainframe, a computing cluster, a cloud computing system, a distributed computing system, a portable computing device, or the like) over one or more networks. The remote computing device may be used to perform some of the functionality of the ALPR system 100 described herein. The network(s) may comprise one or more public networks (e.g., the Internet) and/or one or more private networks. The network(s) may comprise one or more of a personal area network (PAN), local area network (LAN), mesh network, metropolitan area network (MAN), wide area network (WAN), wireless network, Wi-Fi network, Bluetooth network, cellular network and/or any other suitable network(s). The data interface(s) 304 of the camera unit 302 may be part of the processing unit 210 and/or may be one or more separate devices or components connected to the processing unit 210. The data interface(s) 304 may be enclosed within the housing of the camera unit 302.

Figure 4:
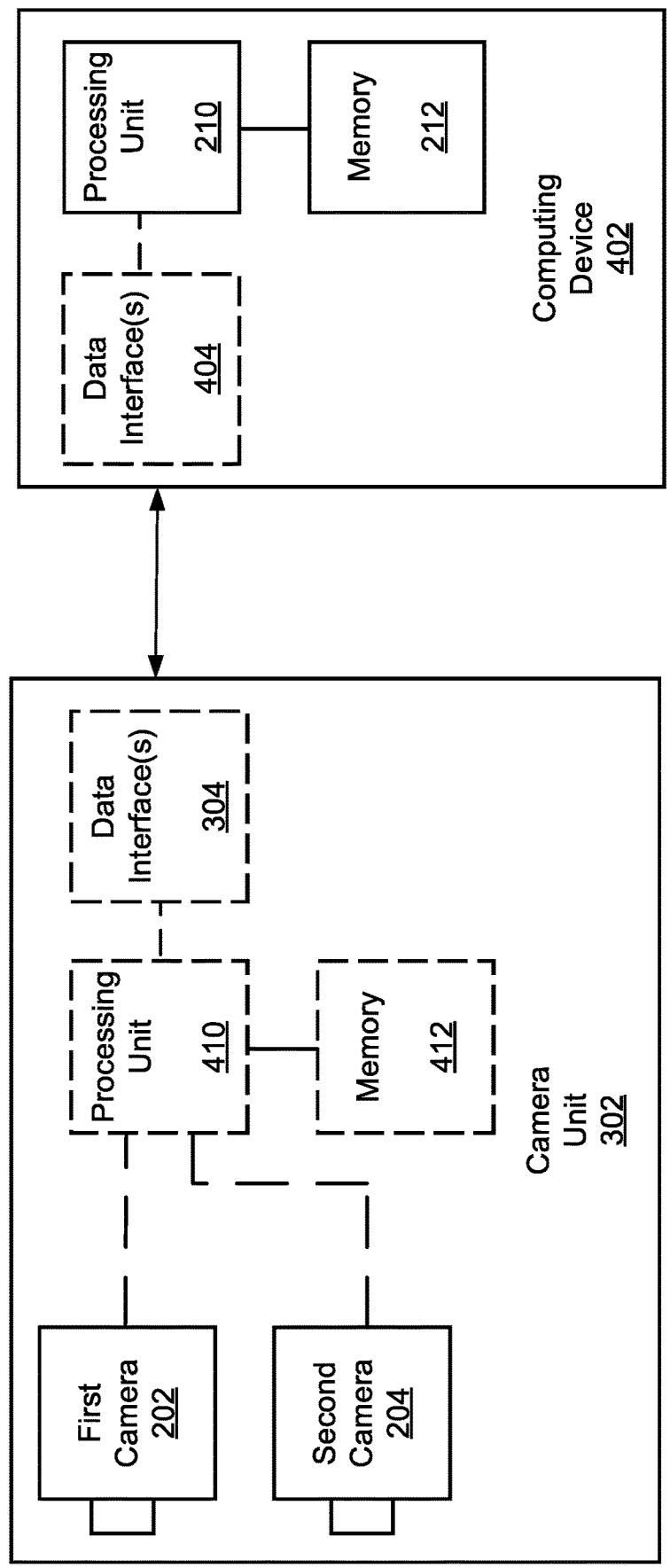
FIG. 4 is a block diagram of an example of the automated license plate recognition system with a computing device separate from a camera unit, in accordance with one or more embodiments.

FIG. 4 illustrates another example of the APLR system 100, where the camera unit 302 comprises the first camera 202 and the second camera 204, and a computing device 402, external and separate from the camera unit 302, comprises the memory 212 and the processing unit 210 for determining the geographical location of the license plate 104 and/or for detecting the license plate 104 and/or identifying the license plate number 106. The camera unit 302 and the external computing device 402 are connected to each other and/or are configured to communicate with each other. The connection may be a wireless or a wired connection for wireless or wired communication, respectively. In some embodiments, the communication may be over a network. In some embodiments, the cameras 202, 204 communicate with the processing unit 210. In this example, the camera unit 302 comprises a housing enclosing the first camera 202 and the second camera 204. The external computing device 402 may be located within the patrol vehicle 102 or may be remote from the patrol vehicle 102 (e.g., one or more computers, a server cluster, a mainframe, a computing cluster, a cloud computing system, a distributed computing system, a portable computing device, or the like). By way of a specific and non-limiting example, the computer device 402 is a trunk unit located in the trunk of the patrol vehicle 102.

The computing device 402 may comprise one or more data interfaces 404 for interfacing with one or more external devices, systems, and/or networks. The data interface(s) 404 may comprise one or more wired and/or wireless data interfaces. For example, the computing device 402 via the data interface(s) 404 may be connected to and/or may be able to communicate with the camera unit 302 via the data interface(s) 304 of the camera unit 302. By way of another example, the computing device 402 via the data interface(s) 404 may be connected to and/or may be able to communicate with a mobile computing device (e.g., a mobile phone, a smart phone, a tablet, a laptop computer, a smart watch, or the like), which may be used by an operator of the patrol vehicle 102. By way of another example, the computing device 402 via the data interface(s) 404 may be able to communicate with a remote computing device (e.g., one or more computers, a server, a server cluster, a mainframe, a computing cluster, a cloud computing system, a distributed computing system, a portable computing device, or the like) over one or more networks. The data interface(s) 404 of the computing unit 402 may be part of the processing unit 210 and/or may be one or more separate devices or components connected to the processing unit 210.

In the example of FIG. 4, the camera unit 302 may further comprise at least one processing unit 410 (or any other suitable controller(s)) and/or at least one memory 412. The processing unit 410 may be configured to control the operation of the cameras 202, 204 in order to acquire digital images, which may be stored in memory 412. The memory 412 may have stored thereon program instructions executable by the processing unit 410 for controlling the cameras 202, 204. Each camera 202, 204 may have a separate processing unit (or controller), which is used to control the operations of the cameras 202, 204. In some embodiments, images are not stored in memory 412 at the camera unit 302 and are stored in the memory 212 of the external computing device 402. The data interface(s) 304 of the camera unit 302 of FIG. 4 may be part of the processing unit 410 and/or may be one or more separate devices connected to the processing unit 410. The camera unit 302 may transmit images captured by the cameras 202, 204 to the external computing device 402 via the data interfaces 304, 404, thereby allowing the images to be stored to the memory 212 and/or to be processed by the processing unit 210. Any other suitable information may be transmitted between the camera unit 302 and the external computing device 402 via the data interfaces 304, 404.

The configuration of the ALPR system 100 (e.g., configuration of the first camera 202, the second camera 204, the processing unit 210, the memory 212, the camera unit 302 and/or the external computing device 402, etc.) is implementation specific and may vary from the embodiments described herein.

Figure 5:
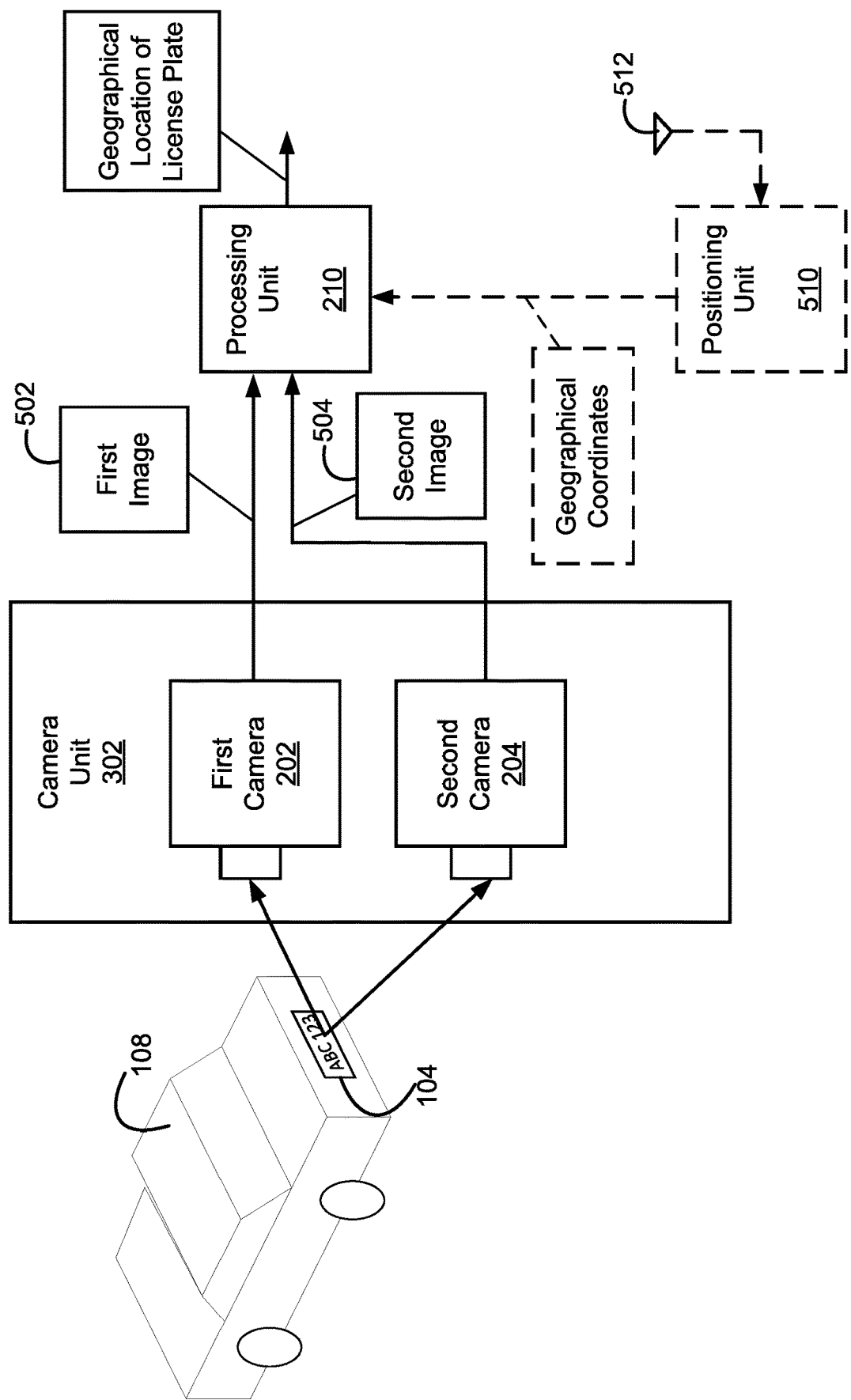
FIG. 5 is a block diagram of an example of an automated license plate recognition system for determining a geographical location of a license plate, in accordance with one or more embodiments.

With reference to FIG. 5, there is shown an example for determining a geographical location of a license plate 104 using stereoscopy. While the processing unit 210 is shown as separate from the camera unit 302 and any external computing device 402 in this example, the processing unit 210 may be part of the camera unit 302 in some embodiments or may be part of the external computing device 402 in some embodiments. The first camera 202 acquires at least at first image 502 of the license plate 104 and the second camera 204 acquires at least a second image 504 of the same license plate 104. The terms "first image" and "second image" as used herein are labels to distinguish between two different images. The order in which the images are acquired is not implied. The first image 502 and the second image 503 of the license plate 104 may be acquired at substantially the same time. Accordingly, the processing unit 210 may synchronize the control of cameras 202, 204 to acquire the first image 502 and the second image 503 at substantially the same time. The processing unit 210 obtains the first image 502 and the second image 504. The processing unit 210 determines a three-dimensional (3D) position of the license plate 104 relative to the camera unit 302 based on stereoscopic image processing of the first and second images 502, 504. The processing unit 210 obtains a geographical location of the camera unit 302. The processing unit 210 determines a geographical location of the license plate 104 from the 3D position of the license plate 104 relative to the camera unit 302 and the geographical location of the camera unit 302. The processing unit 210 outputs the geographical location of the license plate 104.

In some embodiments, as illustrated in FIG. 5, the ALPR system 100 comprises a positioning unit 510 configured to provide geographical coordinates to the processing unit 210. The geographical coordinates provided by the positioning unit 510 to the processing unit 210 may vary depending on practical implementations. The geographical coordinates may be of the camera unit 302. The geographical coordinates may be of one or more antennas 512 connected to (or part of) the positioning unit 510. The geographical coordinates may be of the positioning unit 510. The external computing device 402 may comprise the positioning unit 510. For example, the positioning unit 510 may be a hardware module (e.g., a removable accessory card) of the external computing device 402, which as noted elsewhere may be positioned in the trunk of the patrol vehicle 102. The processing unit 210 may store the geographical coordinates to memory 212 and retrieve the geographical coordinates when needed. The geographical location of the camera unit 302 may be determined by the positioning unit 510 and provided to the processing unit 210. Alternatively, the geographical location of the camera unit 302 may be determined by the processing unit 210 from the geographical coordinates provided by the positioning unit 510. Regardless of which unit determines the geographical location of the camera unit 302, the geographical location of the camera unit 302 may be determined from the geographical coordinates of the antenna(s) 512 based on a known spaced relationship between the antenna(s) 512 and the camera unit 302. For instance, the geographical coordinates may be translated with the known spaced relationship in order to determine the geographical location of the camera unit 302. The processing unit 210 may store the geographical location of the camera unit 302 to memory 212. The processing unit 210 may obtain the geographical location of the camera unit 302 from memory 212 when needed.

The positioning unit 510 may comprise one or more processing units, one or more computer-readable memory and/or any other suitable complements. The positioning unit 510 may be or may comprise a Global Positioning System (GPS) receiver configured to determine geographical coordinates at a GPS antenna, such as the antenna 512, from received GPS signals. Accordingly, the positioning unit 510 is configured to process the GPS signals received at the antenna(s) 512 at provided to a processing unit of the positioning unit 510 (e.g., a processing unit of a GSP receiver) in order to determine the geographical coordinates. The GPS receiver may be referred to as a GPS positioning unit. The term "GPS" as used herein refers to any suitable global navigation satellite system (GNSS). The geographical location of the camera unit 302 may be determined from the geographical coordinates (which may be referred to as GPS coordinates) provided by a GPS receiver. The geographical location of the camera unit 302 may be determined using any suitable technique for enhancing or improving the accuracy of GPS coordinates and/or a geographical location provided by a GPS positioning unit or receiver.

By way of a specific and non-limiting example, the positioning unit 510 is implemented as a hardware module of the external computing device 402 located in the trunk of the patrol vehicle 102. In this example, the known spaced relationship between the antenna(s) 512 and the camera unit 302 are stored in memory 212 of the external computing device 402, and the processing unit 210 of the external computing device 402 is configured to determine the geographical location of the camera unit 302 from the geographical coordinates using the known spaced relationship. The spaced relationship between the antenna(s) 512 and the camera unit 302 may comprise the position and the orientation of the camera unit 302 relative to the antenna(s) 512. The position and orientation of the camera unit 302 with respective to the antenna(s) 512 may be measured at the time the camera unit 302 and external computing device 402 are installed in the patrol vehicle 102 and may then be stored in the memory 212 of the external computing device 402.

In alternative embodiments, the camera unit 302 comprises the positioning unit 510, which may determine the geographical location of the camera unit 302. Accordingly, in some embodiments, the processing unit 210 receives the geographical location of the camera unit 302 from the positioning unit 510. In some embodiments, the positioning unit 510 is external to the camera unit 302 and/or the external computing device 402 and is connected to the camera unit 302 and/or the external computing device 402. The geographical location of the camera unit 302 may be determined in various way depending on practical implementation. The geographical location may be represented as decimal degrees (DD), which expresses latitude and longitude geographic coordinates as decimal fractions. The geographical location may be represented as Degrees/Minutes/Seconds (DMS). The geographical location may be represented in any suitable form that represents at least latitude and longitude geographic coordinates.

The geographical location of the camera unit 302 may be determined from the geographical coordinates obtained by the positioning unit 510 and one or more other inputs or parameters available at the processing unit that determines the geographical location of the camera unit 302. Similarly, the geographical location of the camera unit 302 may be determined from the GPS signals received by the antenna(s) 512 and one or more other inputs or parameters available at the processing unit that determines the geographical location of the camera unit 302. Various examples of determining geographical location of the camera unit 302 are further described below.

In some embodiments, the geographical location of the camera unit 302 is determined based on real-time kinematic (RTK) processing of GPS signals. In some embodiments, the positioning unit 510 is a GPS RTK positioning unit. GPS RTK may be referred to as carrier-phase enhancement of GPS (CPGPS). The positioning unit 510 may comprise a GPS RTK receiver for receiving GPS signals, which are processed to determine the geographical location. In some embodiments, the positioning unit 510 comprises a NEO-M8P module provided by u-blox AG. The RTK processing is a positioning calculation methodology based on the use of carrier phase measurements of the GPS signals and provides real-time corrections to increase accuracy. More specifically, the RTK processing may use measurements of the phase of the signal's carrier wave in addition to information content of the signal and may rely on a single reference station or interpolated virtual station in order to provide the real-time corrections. By using GPS RTK, improved accuracy of a geographical location is typically obtained compared to GPS without RTK.

The geographical location of the camera unit 302 may be determined based on real-time kinematic processing of GPS signals received at the antenna(s) 512 connected to the positioning unit and the known spaced relationship (e.g., orientation and position) of the camera unit 302 relative to the antenna(s) 512. The RTK processing may be implemented by a RTK algorithm that resides in the GPS module of the positioning unit 510. The RTK algorithm may use measurements of the phase of the GSP signal's carrier wave and real-time correction information (e.g., received at the positioning unit 510 from a reference station or interpolated by the positioning unit 510) in order to determine the geographical coordinates of the antenna(s) 512. A processing unit of the positioning unit 510 may then determine the geographical location of the camera unit 302 from the geographical coordinates and the known spaced relationship (e.g., orientation and position) of the camera unit 302 relative to the antenna(s) 512. The processing unit of the positioning unit 510 may then provide the geographical location of the camera unit 302 to the processing unit 210. In some embodiments, the processing described as being performed herein by the processing unit of the positioning unit 510 may be performed by the processing unit 210.

In some embodiments, the geographical location of the camera unit 302 is determined based on dead-reckoning. Dead-reckoning is the process of determining a current geographical location based on a previous geographical location or is the process of determining a position fix (also referred to as a "fix"). In dead-reckoning, the current location or position fix is typically determined using estimates of speed and course over elapsed time. The geographical location of the camera unit 302 may be determined using dead-reckoning from a previous known geographical location of the camera unit 302. For example, the previous geographical location may have been determined using GPS (e.g., RTK GPS). Dead-reckoning may be implemented to prevent loss of the geographical location when there is satellite multipath signal loss, lost signal in tunnels or garages, for example. The dead-reckoning processing from a previous geographical location may comprise tracking the movement of the patrol vehicle 102 with the camera unit 302, and thus tracking the movement of the camera unit 302. The movement may be tracked using one or more of: odometer information of the patrol vehicle 102, gyroscopic information of the patrol vehicle 102, accelerometer information of the patrol vehicle 102, and wheel rotation information of the patrol vehicle 102.

The current geographical location of the camera unit 302 may be determined using a previous known (e.g., last known) geographical location of the camera unit 302 and dead-reckoning information indicative of the geographical change of the camera unit 302 from the previous known geographical location. The dead-reckoning information may comprise one or more of: odometer information, gyroscopic information, acceleration information and wheel rotation information. The odometer information, the gyroscopic information, the acceleration information and/or the wheel rotation information may be received at the positioning unit 510 from one or more sensors, devices, or the like. The positioning unit 510 may comprise or may be connected to one or more sensors for measuring the gyroscopic information and/or the acceleration information. The gyroscopic information may be provided by one or more rotation sensors. The acceleration information may be provided by one or more accelerometers. The positioning unit 510 may be connected to one or more sensors for measuring the wheel rotation information and/or the odometer information of the patrol vehicle 102. The odometer information may be provided by a CANBUS. The wheel rotation may be obtained by a Hall sensor, a magnetic sensor, a vehicle speed sensor (VSS) or the like. An inertial navigation system (INS) may be used to implement the dead-reckoning processing, which is a navigation device that uses a computing device (or processing unit), motion sensors (accelerometers) and rotation sensors (gyroscopes) to continuously calculate by dead-reckoning the position, the orientation, and the velocity (direction and speed of movement) of a moving object without the need for external references. A processing unit of the positioning unit 510 may obtain the previous geographical location of camera unit 302 and then generate current geographical location of camera unit 302 from the previous known geographical coordinates and one or more parameters (e.g., the odometer information, the gyroscopic information, the acceleration information and/or the wheel rotation information; or information from the INS) indicative of the geographical change of the camera unit 302. The processing unit of the positioning unit 510 may provide the current geographical location of the camera unit 302 to the processing unit 210.

In some embodiments, the images 502, 504 are acquired at the same time, and are timestamped with the time that they are acquired using a local time framework. The processing unit 210 may obtain a geographical location of the camera unit 302 and corresponding satellite time for the obtained geographical location, and then timestamps this using the same local time framework. If the time and the frequency on the images and geographical location do not coincide, the geographical location and the global satellite time may be inferred at the precise time the images 502, 504 are acquired by using a mathematical method known as "interpolation".

One approach is the linear interpolation, which assumes that the vehicle 102 is driving at constant speed on a straight line. Other more precise interpolations that consider the vehicle's acceleration and radius of a curve may be used. This approach to interpolating a geographical location is referred to herein as "frequency interpolation". Alternatively, the geographical location with the local time closest to the local time of the timestamp of the images 502, 504 may be used. Accordingly, the images 502, 504 may be acquired at substantially the same time and the geographical location of the camera unit 302 may be obtained for substantially the same time that the images 502, 504 were acquired.

In general, frequency interpolation is a method to estimate an intermediate geographical coordinate (e.g., GPS coordinate) between two geographical coordinates based on the previous and optionally posteriori trajectory. Frequency interpolation may also be implemented by the use of external sensors, like accelerometer, gyroscope and displacement (e.g., wheel ticks or odometry, such as used in the dead-reckoning processing). Frequency interpolation may be implemented by a processor of the positioning unit 510 (e.g., to provide a higher frequency of GPS positions), or by the processor unit 210, for example of the external computing device 402, (e.g., to be able to get a GPS position at the exact time of the image exposure). Frequency interpolation may use simple linear interpolations, which assumes constant speed and strait line, or more evolved algorithms, like Kalman filters or any other suitable algorithm.

The geographical location of the camera unit 302 may be determined based on frequency interpolation between two geographical coordinates indicative of the geographical location of the camera unit 302. The two geographical coordinates are indicative of the geographical location of the camera unit 302 as the two geographical coordinates may be at the antenna(s) 512 (or other location of the patrol vehicle 102) and can be transformed using the known space relationship to determine the geographical location of the camera unit 302. Thus, the geographical location of the camera unit 302 may be determined based on frequency interpolation and the known spaced relationship (e.g., orientation and position) of the camera unit 302 relative to the antenna(s) 512. In some embodiments, the two geographical coordinates are of the geographical location of the camera unit 302. By way of an example, a third geographical coordinate may be generated from the two geographical coordinates for the antenna(s) 512 at two different times (i.e., a first geographical coordinate at a first time and a second geographical coordinate at a second time), where the third geographical coordinate is indicative of the location of the antenna(s) 512 at a time occurring between the first time and second time. Then, the geographical location of the camera unit 302 may be determined from the third geographical coordinate and the known spaced relationship between the camera unit 302 and the antenna(s) 512. By way of another example, a third geographical location of the camera unit 302 may be generated from two geographical locations of the camera unit 302 at two different times (i.e., a first geographical location of the camera unit 302 at a first time and a second geographical location of the camera unit 302 at a second time), where the third geographical location of the camera unit 302 is at a time occurring between the first time and the second time. In these examples, the third time substantially corresponds to the time that the images 502, 504 were taken.

In some embodiments, the geographical location of the camera unit 302 is determined based on a combination of one or more of GPS RTK, dead-reckoning and frequency interpolation. For example, the geographical location of the camera unit 302 may be determined based on dead-reckoning of a geographical location determined from GPS RTK. This would be useful when the patrol vehicle 102 enters an area where GPS signals cannot be received. By way of another example, frequency interpolation may be implemented with GPS RTK.

Figure 6:
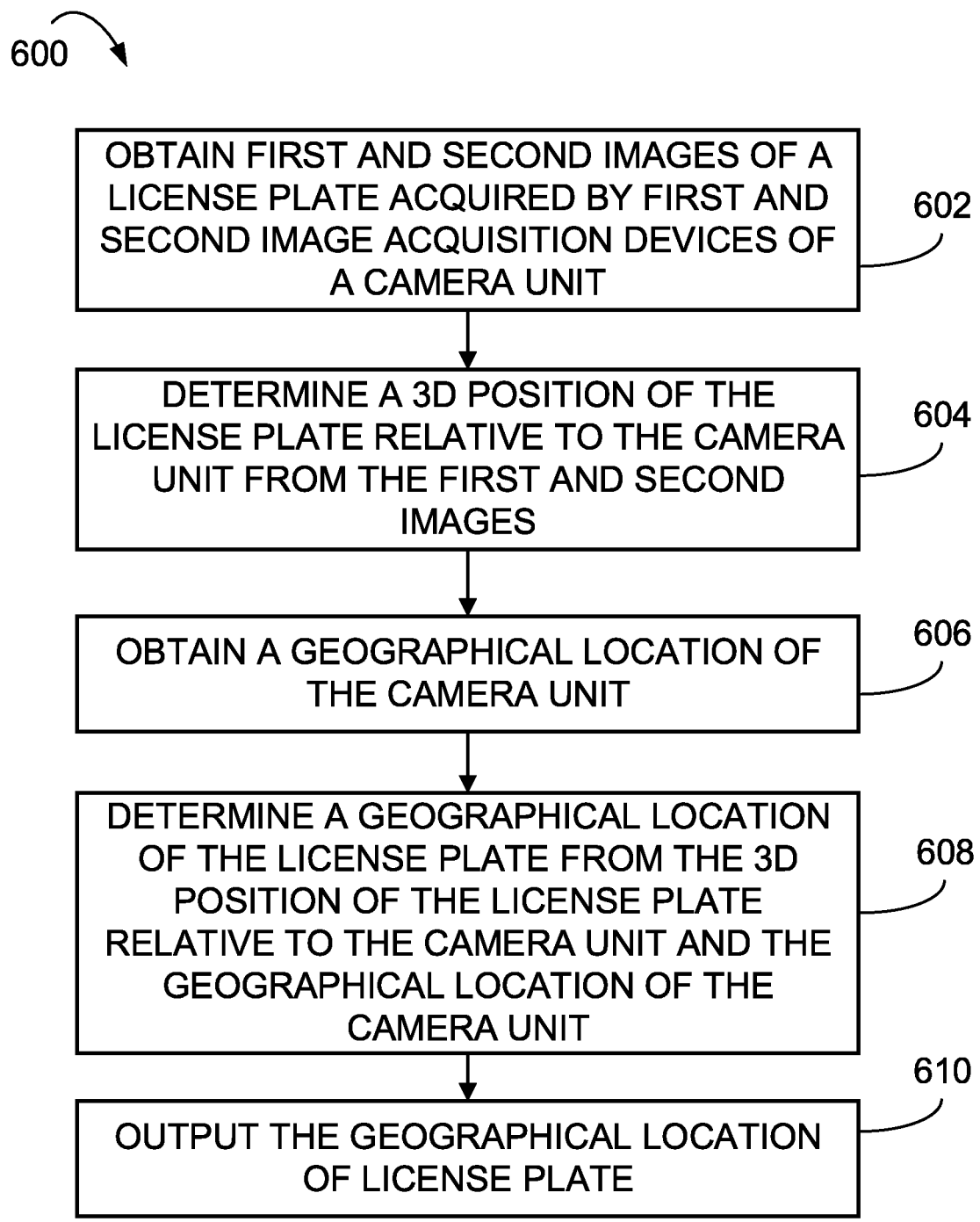
FIG. 6 is a flowchart illustrating an example method for determining a geographical location of license plate, in accordance with one or more embodiments.

With reference to FIG. 6, there is shown a flowchart illustrating an example method 600 for determining a geographical location of a license plate of a vehicle, such as license plate 104 of vehicle 108. The method 600 may be implemented by an ALPR system, such as ALPR system 100. The steps of the method 600 may be performed by the processing unit 210. Reference to the environment of FIG. 1 and/or the ALPR system 100 in the explanation of the method 600 is for example purposes only. The method 600 may be automatically performed when a vehicle 108 and/or a license plate 104 is detected by the ALPR system 100. The method 600 may be performed in response to a command (e.g., from an operator in the patrol vehicle 108) to perform the method 600.

At step 602, at least a first image 502 of a license plate 104 acquired by a first image acquisition device 202 is obtained and at least a second image 504 of the license plate 104 acquired by a second image acquisition device 204 is obtained. The first image acquisition device 202 and the second image acquisition device 204 are part of a camera unit 302. In some embodiments, the first image 502 and the second image 504 are obtained directly from the first image acquisition device 202 and the second image acquisition device 204, respectively. The first image 502 and the second image 504 may then be stored to memory 212. In some embodiments, the first image 502 and the second image 504 are obtained from memory 212. For instance, the first and second images 502, 504, captured by the first and second image acquisition devices 202, 204, may be stored to memory 212 prior to performance of step 602.

At step 604, a 3D position of the license plate 104 relative to the camera unit 302 comprising the first image acquisition device 202 and the second image acquisition device 204 is determined. The 3D position of the license plate 104 relative to the camera unit 302 is determined based on stereoscopic image processing of the first image 502 and the second image 504. As the 3D position of the license plate 104 is determined based on stereoscopy, the 3D position of the license plate 104 may be referred to as a "three-dimensional stereoscopic-based position of the license plate". The 3D position of the license plate 104 may be represented by a Cartesian coordinate system in three-dimensional space. The 3D position of the license plate 104 may be represented by (x, y, z) distance values relative to a given reference point of the camera unit 302. The reference point may be a point between the cameras 202, 204. Accordingly, reference to the 3D position of the license plate 104 being relative to the camera unit 302 may refer to the 3D position of the license plate 104 being relative to cameras 202, 204. The location of the reference point may vary depending on practical implementations.

At step 606, a geographical location of the camera unit 302 is obtained. The geographical location of the camera unit 302 may represent the latitude and longitude geographic coordinates of the camera unit 302. The geographical location of the camera unit 302 may represent the latitude, longitude and elevation geographic coordinates of the camera unit 302. In some embodiments, the geographical location of the camera unit 302 is obtained from a positioning unit 510, which determines the geographical location of the camera unit 302. In some embodiments, the geographical location of the camera unit 302 is determined based on geographical coordinates provided by the positioning unit 510. In some embodiments, the geographical location of the camera unit 302 is obtained from memory 212. The geographical location of the camera unit 302 may be determined based on real-time kinematic processing of GPS signals. The geographical location of the camera unit 302 may be determined based on a previous known geographical location of the camera unit 302 and dead-reckoning information. The geographical location of the camera unit 302 may be determined based on frequency interpolation. In regards to frequency interpolation, if the obtained geographical coordinates do not coincide in time with the time that the images 502, 504 are acquired, the geographical coordinates at the time that the images 502, 504 are acquired may be interpolated from previous and possibly latter geographical coordinates. Alternatively, the geographical coordinates closest in time may be selected. The geographical location of the camera unit 302 may be referred to as a GPS-based geographical location. The geographical location of the camera unit 302 may have an accuracy within a range of the actual geographical location of the camera unit 302. In other words, the obtained geographical location of the camera unit 302 may be substantially within a given value of the actual real-world geographical location of the camera unit 302. For example, the range (or given value) may be 2 cm, 5 cm, 10 cm, 20 cm, 25 cm, 30 cm, 40 cm, 50 cm, 75 cm, 1 meter, 2 meters, 3 meters, 5 meters, or any other suitable value. The ultimate range would depend on the specific implementation of the APLR system 100.

At step 608, a geographical location of the license plate 104 is determined. The geographical location of the license plate 104 is determined from the 3D position of the license plate 104 relative to a camera unit 302 and the geographical location of the camera unit 302. The geographical location of the license plate 104 may be determined by transforming the geographical coordinates (e.g. latitude and longitude coordinates) of the camera unit 302 represented by the geographical location of the camera unit 302 with the 3D position of the license plate 104 relative to the camera unit 302 to determine new geographical coordinates that represent the geographical location of the license plate 104. For instance, the geographical coordinates (e.g. latitude and longitude coordinates) of the camera unit 302 may be transformed by the x, y, and z Cartesian coordinates of the 3D position of the license plate 104 relative to the camera unit 302 in order to determine the geographical coordinates (e.g. latitude and longitude coordinates) of the license plate 104 in the real-world. The geographical location of the license plate 104 may represent the latitude and longitude geographic coordinates of the license plate 104 in the real-world. The geographical location of the license plate 104 may represent the latitude, longitude and elevation geographic coordinates of the license plate 104 in the real-world.

At step 610, the geographical location of the license plate 104 is outputted. The outputting of the geographical location of the license plate 104 may be for storage to memory, for transmission to an external system or device and/or for display to a display device. For example, the geographical location of the license plate 104 may be stored in memory 212. By way of another example, the geographical location of the license plate 104 may be transmitted to another computing device (e.g., a portable computing device in the patrol vehicle 102 or a remote computing device distant from the patrol vehicle 102), which may then store in memory the geographical location of the license plate 104.

The geographical location of the license plate 104 may be associated with one or more images of the license plate 104 (e.g., the first or second image) and/or of the vehicle 108 with said license plate 104. The geographical location of the license plate 104 may be associated with a violation detected with (or in association with) the APLR system 100, such as a parking violation or a speeding violation. The geographical location of the license plate 104 may be outputted for display on another computing device connected to or comprising a display device (e.g., a cathode ray tube display screen, a light-emitting diode (LED) display screen, a liquid crystal display (LCD) screen, a touch screen, or any other suitable display device).

It should be appreciated that by using stereoscopic image processing and an accurate geographical location of the camera unit 302 that an accurate geographical location of the license plate 104 may be determined. That is, the determined geographical location of the license plate 104 may be within an accurate range of the actual geographical location of license plate. In other words, the determined geographical location of the license plate 104 may be substantially within a given value of the actual real-world geographical location of the license plate 104. For example, the range (or given value) may be 2 cm, 5 cm, 10 cm, 20 cm, 25 cm, 30 cm, 40 cm, 50 cm, 75 cm, 1 meter, 2 meters, 3 meters, 5 meters, or any other suitable value. The ultimate range would depend on the specific implementation of the APLR system 100.

Figure 7:
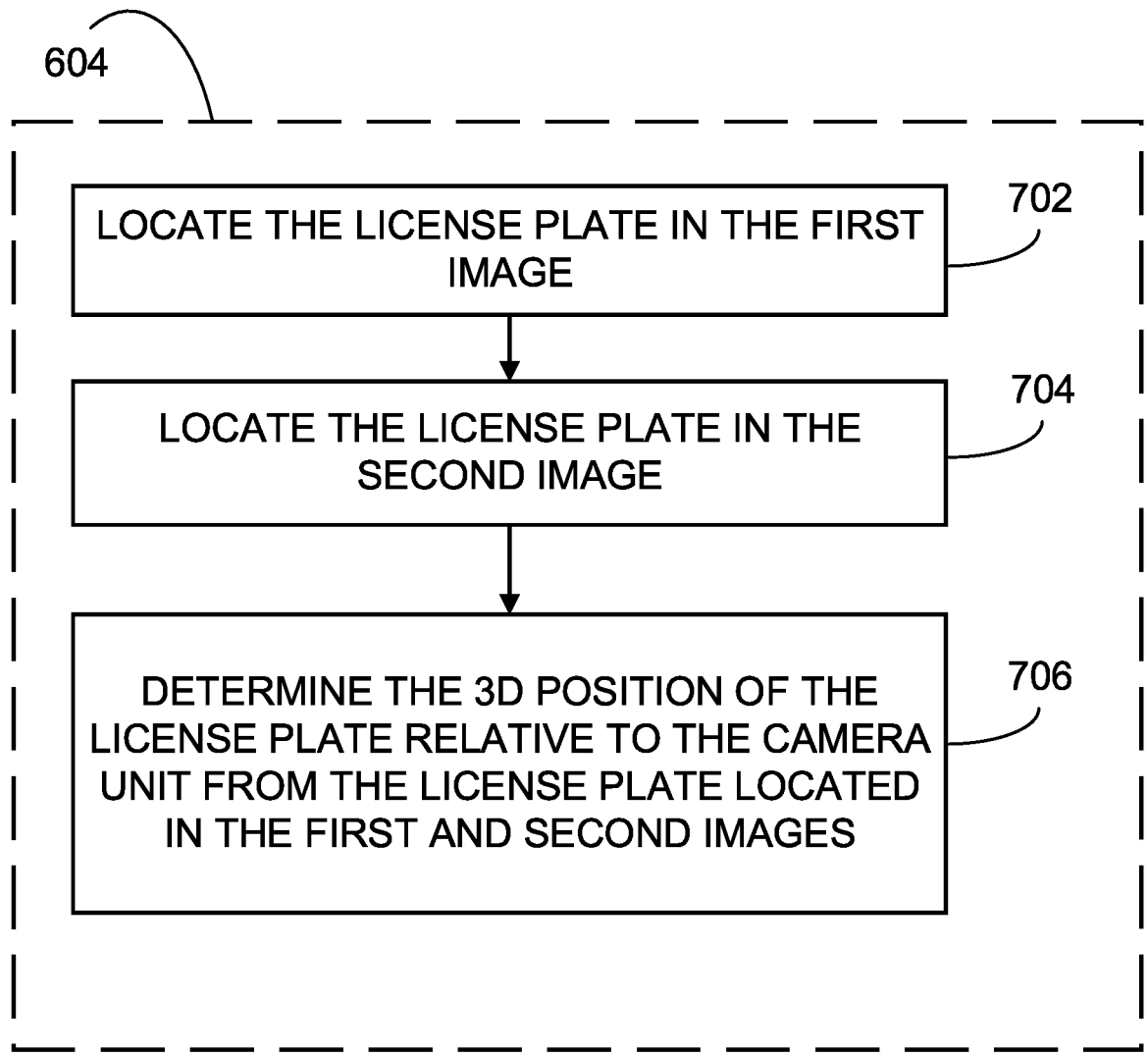
FIG. 7 is a flowchart illustrating an example of the step of determining a three-dimensional position of a license plate relative to a camera unit of the method of FIG. 6, in accordance with one or more embodiments.

With reference to FIG. 7, there is shown a flowchart illustrating an example for determining the 3D position of the license plate 104 at step 604 of the method 600. At step 702, the license plate 104 is located in the first image 502. That is, the position of the license plate 104 in the first image 502 is located.

Figure 8:
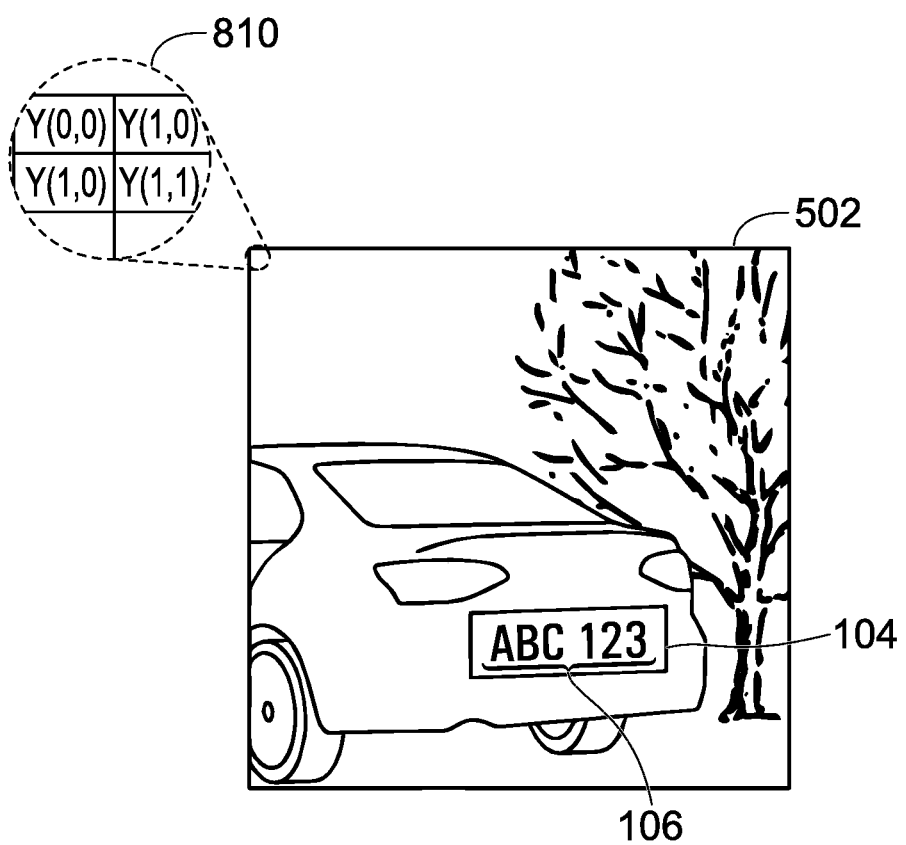
FIG. 8 is an example of a digital image, in accordance with one or more embodiments.

With additional reference to FIG. 8, each acquired digital image, such as the first image 502, comprises a grid of pixels. The individual pixels are not shown in FIG. 8, except for in magnified portion 810. Each pixel has a location coordinate (x, y) indicating the location of the pixel in the digital image, as well as a corresponding pixel value Y(x, y). The magnified portion 254 illustrates a few pixels around coordinate (x, y)=(0, 0), each having a respective pixel value Y(x, y). The pixel value represents the intensity of the pixel at the pixel coordinate. A pixel value may have an intensity consisting of a single component, e.g. when the camera 202 or 204 provides a monochromatic output, as is typical with infrared cameras. In other embodiments, a pixel value may have an intensity consisting of different components, e.g. a red, green, and blue component, or a luminance (Y), blue-difference chroma (Cb), and red-difference chroma (Cr) component if the image taken by the camera 202 or 204 is a colour image. In the case of multi-component pixels, the pixel value may be the value of a single component (typically luminance) or a value derived as a function of multiple components. In one embodiment, the cameras 202, 204 capture monochromatic images, and the pixel value of each pixel in a captured monochromatic image is a single luminance component that represents the intensity of that pixel.

Figure 9:
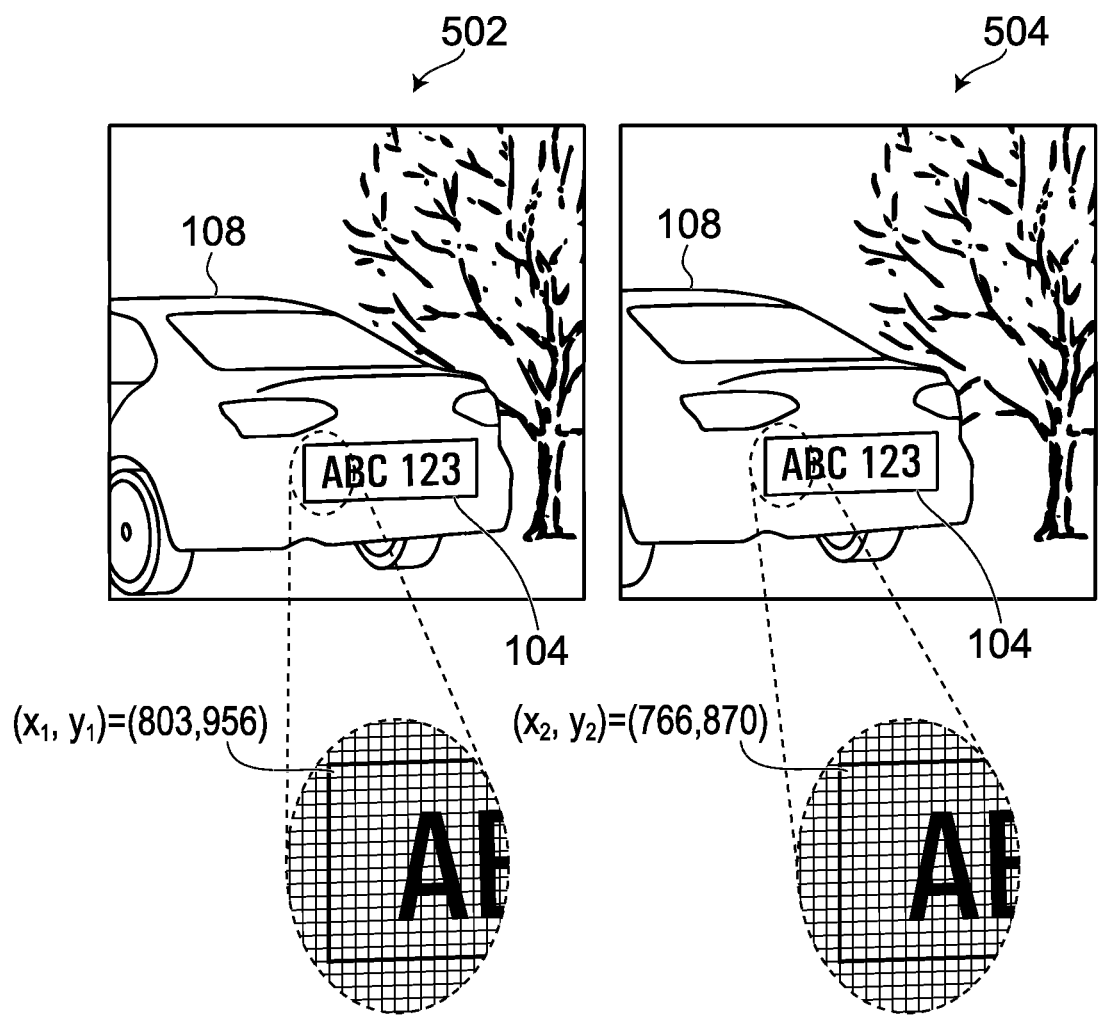
FIG. 9 is an example of a first image acquired by a first camera and a second image acquired by a second camera of the automated license plate recognition system, in accordance with one or more embodiments.

With additional reference to FIG. 9, locating the license plate 104 in the first image 502 may comprise identifying the pixel coordinates indicative of the license plate 104 in the first image 502. Identifying the pixel coordinates indicative of the license plate 104 in the first image 502 may comprise identifying the pixel coordinates of one or more given points of the license plate 104 in the first image 502. For example, the pixel coordinates of one or more of the corners of the license plate 104 in the first image 502 may be identified. In FIG. 9, the pixel coordinates of one of the corners is shown; however, the pixel coordinates of all four corners of the license plate 104 in the first image 502 may be identified. By way of another example, the pixel coordinates of all of the pixels that correspond to license plate 104 in the first image 502 may be identified. By way of yet another example, the pixel coordinates of a rectangular area that encompasses the license plate 104 in the first image 502 may be identified. In some embodiments, locating the license plate 104 in the first image 502 may comprise locating the pixel coordinates corresponding to a center point of the license plate 104 in the first image 502. The pixel coordinates of the center point of the license plate 104 in the first image 502 may be found from the pixel coordinates of the corners of the license plate 104.

Referring back to FIG. 7, at step 704, the license plate 104 is located in the second image 504. That is, the position of the license plate 104 in the second image 504 is located. The locating of the license plate 104 in the second image 504 may be implement in the same or similar manner as the locating of the license plate 104 in the first image 502. The locating of the license plate 104 in the second image 504 may comprise identifying a rectangular region in the second image 504 based on the location of the license plate 104 in the first image 502, and then searching the rectangular region for the license plate 104. For example, the rectangular region to search in the second image 502 may correspond to a same-sized rectangular region encompassing the license plate 104 in the first image 502 and being smaller in pixel dimensions than the images 502, 504. Locating the license plate 104 in the second image 504 may comprise identifying the pixel coordinates indicative of the license plate 104 in the second image 504. Identifying the pixel coordinates indicative of the license plate 104 in the second image 504 may comprise identifying the pixel coordinates of one or more given points of the license plate 104 in the second image 504. For example, the pixel coordinates of one or more of corners of the license plate 104 in the second image 504 may be identified. In FIG. 9, the pixel coordinates of one of the corners of the license plate 104 in the second image 504 is shown; however, the pixel coordinates of all four corners of the license plate 104 in the second image 504 may be identified. By way of another example, the pixel coordinates of all of the pixels that correspond to license plate 104 in the second image 504 may be identifier. By way of yet another example, the pixel coordinates of a rectangular area that encompasses the license plate 104 in the second image 504 may be identified. In some embodiments, locating the license plate 104 in the second image 504 may comprise locating the pixel coordinates corresponding to a center point of the license plate 104 in the second image 504. The pixel coordinates of the center point of the license plate 104 in the second image 504 may be found from the pixel coordinates of the corners of the license plate 104.

The exact procedure for locating the position of license plate 104 in the images 502, 504 is implementation specific. In some embodiments, the procedure for locating the license plate 104 in the images 502, 504 may be based at least in part upon identifying pixels with different intensities (e.g., the license plate 104 may correspond to pixel with higher intensities from that of the surrounding image). An example method for searching for a license plate in a digital image to locate the license plate is disclosed in Zheng, D., Zhao, Y. and Wang, J., 2005. "An efficient method of license plate location", *Pattern recognition letters*, 26(15), pp. 2431-2438. Another example method is disclosed in Anagnostopoulos, C. N. E., Anagnostopoulos, I. E., Loumos, V. and Kayafas, E., 2006, "A license plate-recognition algorithm for intelligent transportation system applications", *IEEE Transactions on Intelligent transportation systems,* 7(3), pp. 377-392. These aforementioned methods are provided for example purposes only and the exact method used may vary depending on practical implementations.

At step 706, the 3D position of the license plate 104 relative to the camera unit 302 is determined from the position of the license plate 104 located in the first image 502 and the second image 504. That is, the 3D position of the license plate 104 relative to the camera unit 302 is determined based on a first position of the license plate 104 in the first image 502 and a second position of the license plate 104 in the second image 502. The 3D position of the license plate 104 relative to the camera unit 302 may be determined from the identified pixel coordinates indicative of the license plate 104 in the first image 502 and the second image 504. For example, the pixel coordinates of a given corner of the license plate 104 in first and second images 502, 504 may be used to determine the 3D position of the license plate 104 relative to the camera unit 302. By way of another example, the pixel coordinates of the four corners of the license plate 104 in first and second images 502, 504 may be used to determine the 3D position of the license plate 104 relative to the camera unit 302. By way of yet another example, the pixel coordinates of the center of the license plate 104 in first and second images 502, 504 may be used to determine the 3D position of the license plate 104 relative to the camera unit 302. The 3D position of the license plate 104 relative to the camera unit 302 may be determined based on prior knowledge of the physical dimensions of one or more license plates. For example, the pixel coordinates of the four corners of the license plate and the physical dimensions of an expected license plate (e.g., the physical dimensions of a license plate associated with a location, for example, such as a state or province) may be used to determine the 3D position of the license plate 104 relative to the camera unit 302.

The cameras 202, 204 may be mounted in or on the camera unit 302 such that the optical axes of the lens of the cameras 202, 204 are parallel to each other, which will cause there to be a parallax shift or perspective difference between the cameras 202, 204. The perspective difference between the two cameras 202, 204 forms the basis for determining the 3D position of the license plate 104 relative to the cameras 202, 204 of the camera unit 302. Effectively, the difference between the relative angles of view of the cameras 202, 204 of the license plate 104 as captured by the first and second images 502, 504 is used to determine the 3D position of the license plate 104 relative to the cameras 202, 204 of the camera unit 302. In some embodiments, the optical axes of the lenses of the cameras 202, 204, may not be parallel to each other, and there may be a parallax error. In some embodiments, configuration information of the cameras 202, 204 may be used to accommodate for the parallax error.

The 3D position of the license plate 104 relative to the camera unit 302 may be determined based on configuration information of the cameras 202, 204. The camera configuration information may be obtained from memory 212 or 412, as the camera configuration information may have been saved to memory after the camera unit 302 was calibrated, for example, during production. For example, when the camera unit 302 is implemented with the external computing device 402, the memory 412 of the camera unit 302 may comprise the camera configuration information. The camera configuration information may comprise one or more of: camera position (e.g., position of the cameras 202, 204), camera orientation (e.g., orientation of the cameras 202, 204), focal length (e.g., focal length of the cameras 202, 204), and distortion (e.g., distortion of the cameras 202, 204). Accordingly, the 3D position of the license plate 104 relative to the camera unit 302 may be determined from the camera configuration information and the license plate 104 located in the first image 502 and the second image 504.

In some embodiments, determining the 3D position of the license plate 104 relative to the camera unit 302 comprises determining a pixel shift of the license plate 104 between the first image 502 and the second image 504. The pixel shift is determined based on a difference of the pixel coordinates of the license plate 104 in the first image 502 and the second image 504. For example, a pixel shift between one or more of the corners of the license plate 104 may be determined. In the example of FIG. 9, the pixel shift between a given corner is determined as: (803, 956)–(766, 870)=(–37,–86). By way of another example, a pixel shift between the center point of the license plate 104 may be determined. By way of another example, the pixel shift of the license plate 104 may be determined based on taking an average of the pixel shifts of each corner of the license plate 104. In some embodiments, the 3D position of the license plate 104 relative to the camera unit 302 is determined based on the pixel shift. In some embodiments, the 3D position of the license plate 104 relative to the camera unit 302 is determined based on the pixel shift and the camera configuration information. The pixel shift may be represented by one or more displacement vectors.

Figure 10A:
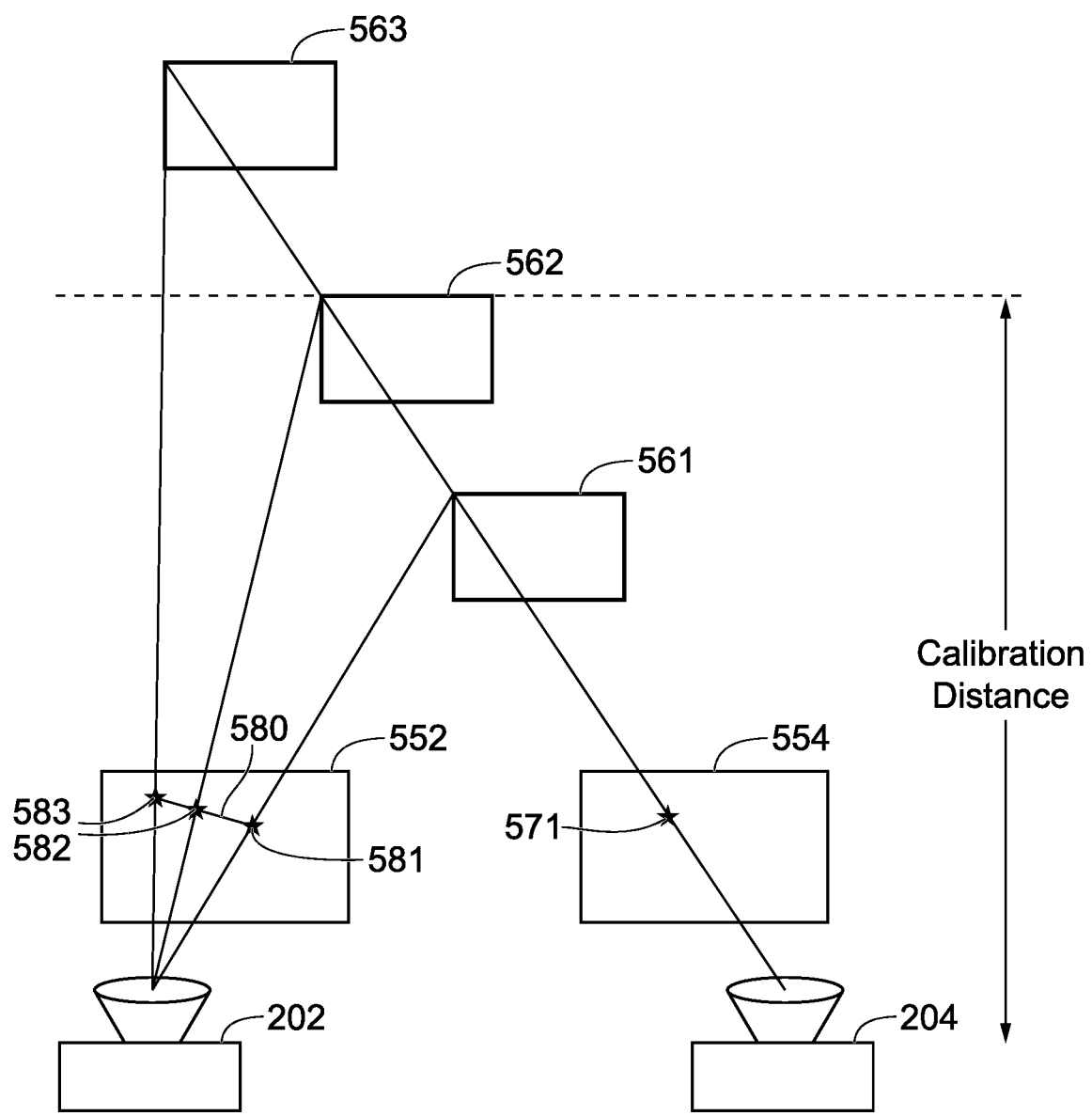
FIG. 10A is a block diagram for illustrating a relationship between two images acquired by two cameras, in accordance with one or more embodiments.

With reference to FIG. 10A, an example shows the first camera 202 and the second camera 204 respectively acquiring a first image 552 and a second image 554 of three objects 561, 562, and 563 at three different distances from the cameras 202, 204. In this example, the three objects 561, 562, and 563 are aligned for the second camera 204, which means they would be imaged into the same pixel 571. However, this is not the case for the first image 552, as the three objects 561, 562, and 563 are images to three distinct pixels 581, 582, and 583, respectively. Thus, generally, a pixel 571 in one image 554 corresponds to a line 580 (connecting the pixels 581, 582, and 583) in another image 552. If the objects 561, 562, and 563 are far away from the cameras 202, 204, with respect to the distance separating them, the line 580 might be very short, only a few pixels long. But if the objects 561, 562, and 563 are close to the cameras, that line 580 may be long, meaning that knowing the position of an object in the image 554 from the second camera 554 only tells us that the object will be somewhere along a line in the image 552 of the first camera 552. With calibration, there is a one-to-one correspondence between the pixels of both cameras 202, 204 at some fixed distance. This fixed distance corresponds to the calibration distance at which the calibration object is placed with respect to the cameras 202, 204 during a calibration processed described elsewhere in this document. In the example illustrated in FIG. 10A, the second object 562 is at the calibration distance.

Considering now having localized a license plate in an image from camera 204, a rectangular region of this image around the license plate may be determined. Then, a similar rectangular region in an image from camera 202, along the line 580 given by the calibration procedure, may be searched. If the distance from the cameras 202, 204 to the license plate is much larger than the distance between the cameras 202, 204, then a cross-correlation procedure may be performed between the rectangular region in the image from camera 204 with a same-sized rectangular region around a point along the line in the image from camera 202. This cross-correlation procedure may provide a measure of the quality of correspondence between the two rectangular regions. Finding the location along the line where cross-correlation is highest would provide the precise location in the image from camera 202. Then, using triangulation based on the camera information from calibration, the exact distance from the cameras 202, 204 to the license plate may be determined. To get a precise distance, the license plate may have to be located with sub-pixel precision in the images. This may be done by fitting the cross-correlation data taken at each pixel location along the line 580 in image 552 to a parabolic model; the peak of the parabola corresponds to be the precise location of the license plate. In some embodiments, normalized cross-correlation can be used in place of cross-correlation.

Figure 10B:
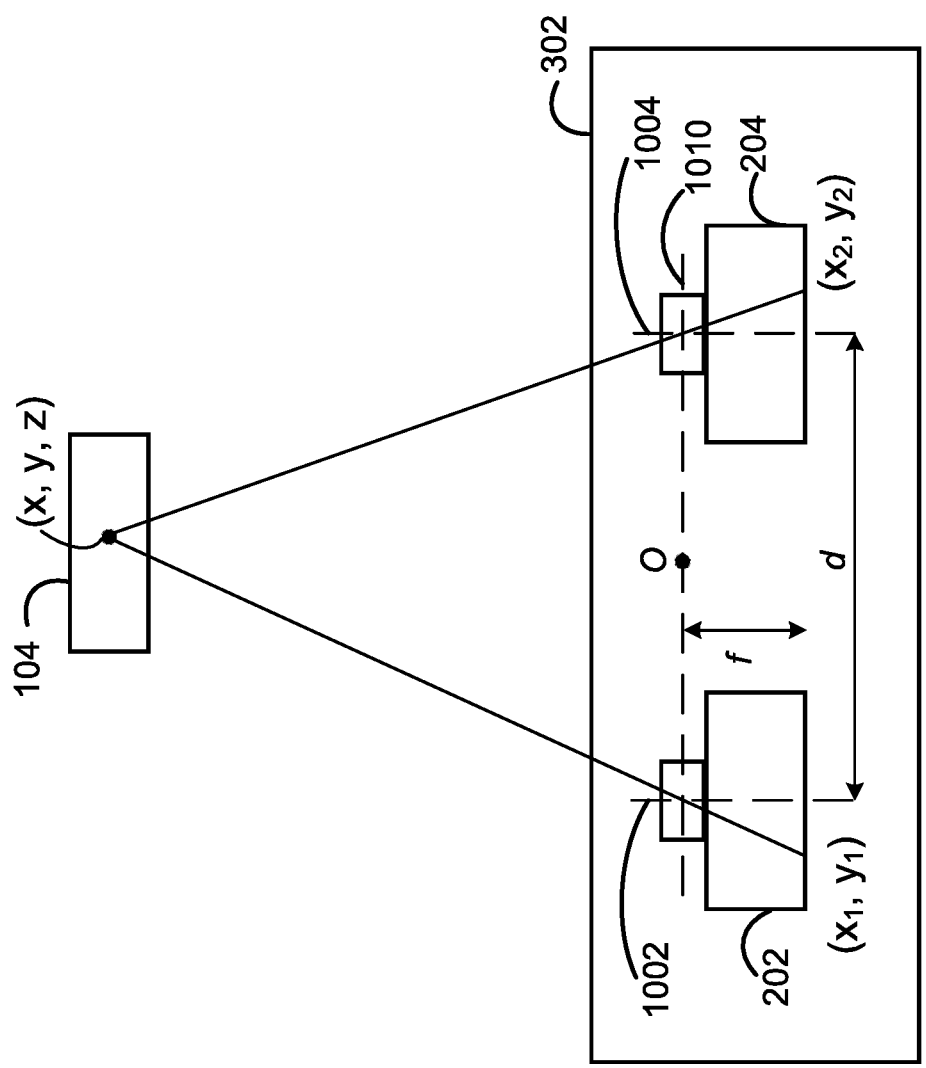
FIG. 10B is a block diagram for illustrating a process of determining a three-dimensional position of a license plate relative to a camera unit, in accordance with one or more embodiments.

With reference to FIG. 10B, a simplified example for determining the 3D position of the license plate 104 relative to the camera unit 302 using triangulation is provided. In this example, the 3D position of the license plate 104 is determined based on camera configuration information and using the center point of the license plate 104. While this example is described using the center point of the license plate 104 any other point of the license plate 104 (e.g., any one or more of the corners) may alternatively be used. In FIG. 10B, the optical axis 1002, 1004 of the cameras 202, 204 are parallel and are separated by a distance d between the cameras 202, 204. In this example, the cameras 202, 204 have the same focal length f. The line 1010 connecting the lens of the cameras 202, 204, is referred to as the baseline. The baseline is perpendicular to the line of sight of the cameras. The x-axis of the three-dimensional coordinate system is parallel to the baseline. The origin O of coordinate system is the mid-way between center of the lens of the cameras 202, 204. The center of the license plate is represented by (x, y, z) relative to the origin O. Accordingly, in this example, the 3D position of the license plate 104 corresponds to the 3D position (x, y, z) and is relative to the origin O. The located center of the license plate 104 in the first image 502 corresponds to $(x_1, y_1)$ and the located center of the license plate 104 in the second image 504 corresponds to $(x_2, y_2)$. By similar triangles, the following equations may be derived:

$$\frac{x_1}{f} = \frac{x + d/2}{z}, \qquad (1)$$

$$\frac{x_2}{f} = \frac{x - d/2}{z}, \qquad (2)$$

$$\frac{y_1}{f} = \frac{y_2}{f} = \frac{y}{z}, \qquad (3)$$

The 3D position (x, y, z) of the license plate 104 may then be determined from the following equations:

$$x = \frac{d(x_1 + x_2)}{2(x_1 - x_2)}, \qquad (4)$$

$$y = \frac{d(y_1 + y_2)}{2(x_1 - x_2)}, \qquad (5)$$

$$z = \frac{df}{x_1 - x_2}, \qquad (6)$$

The example described in relation to FIG. 10B provides one specific and non-limiting example of how the 3D position of the license plate 104 may be determined. The exact procedure for determining the 3D position of the license plate 104 relative to the cameras 202, 204 is implementation specific and varies depending on the configurations of the cameras 202, 204.

In some embodiments, at step 604 of FIG. 6, a 3D depth map is generated from the first image 502 and the second image 504, and the 3D position of the license plate 104 relative to the camera unit 302 is determined from the 3D depth map.

In some embodiments, the method 600 further comprises identifying the license plate number 106 of the license plate 104. The license plate number 106 may be identified in one or more of the first image 502 and the second image 504, or a combination thereof. Characters, numbers and/or symbols of the license plate number 106 may be identified in the first image 502 and/or the second image 504 to identify the license plate number 106. The process for identifying a license plate number in one or more images of a license plate is implementation specific. As one example, process for identifying a license plate number may comprise optical character recognition (OCR) to make a decision as to what license plate number is on a license plate. An example that may be used for identifying a license plate number is disclosed in Anagnostopoulos, C. N. E., Anagnostopoulos, I. E., Loumos, V. and Kayafas, E.; 2006, "A license plate-recognition algorithm for intelligent transportation system applications", *IEEE Transactions on Intelligent transportation systems*, 7(3), pp. 377-392.

In some embodiments, the method 600 further comprises obtaining a context image of the vehicle 108 with the license plate 104 and associating the geographical location of the license plate 104 with the context image.

Figure 11:
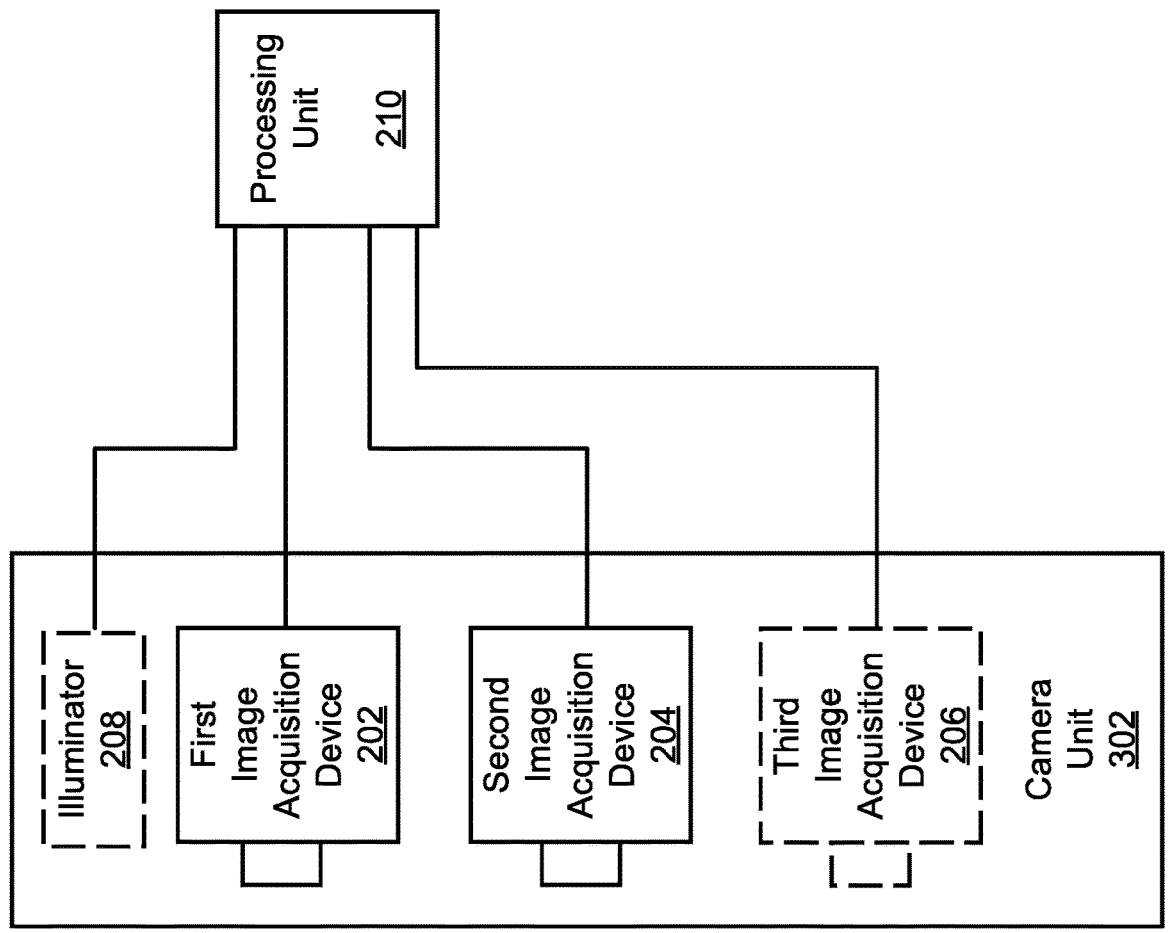
FIG. 11 is a block diagram illustrating a camera unit with an optional third image acquisition devices and an optional illuminator, in accordance with one or more embodiments.
Figure 11:
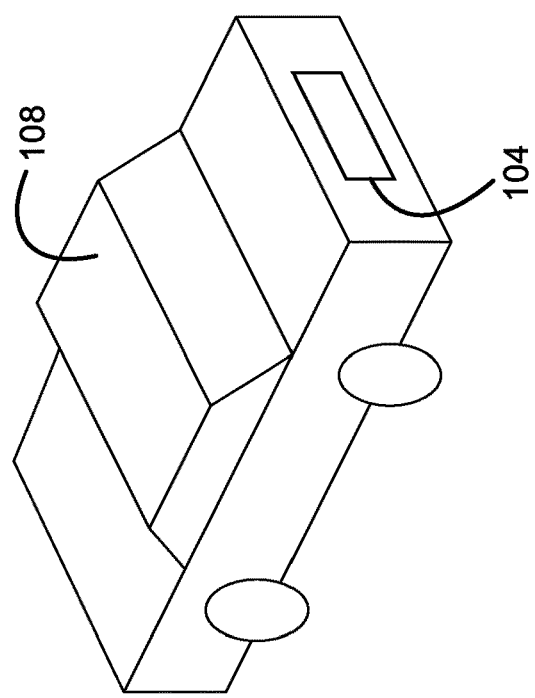

With reference to FIG. 11, in some embodiments, the camera unit 302 comprise a third image acquisition device 206. In some embodiments, the first image acquisition device 202 is a first digital camera for capturing license plates and the second image acquisition device 204 is a second digital camera for capturing license plates. The first digital camera and second digital camera may be referred to as a first LPR camera and second LPR camera, respectively, as these cameras are configured for capturing license plates. In some embodiments, the third image acquisition device 206 is a digital camera for capturing context surrounding the captured license plates (e.g., the vehicle 108 with the license plate 104, the surrounding of the vehicle 108, etc.). In some embodiments, the first image acquisition device 202 and the second image acquisition device 204 have substantially the same (i.e., the same or similar) wavelength sensitivities. In some embodiments, the third image acquisition device 206 has a wavelength sensitivity different from the wavelength sensitivities of the first and second image acquisition devices 202, 204. For example, one or more of the image acquisition devices 202, 204, 206 may have wavelength sensitivities to capture visible light, while one or more of the image acquisition devices 202, 204, 206 may have wavelength sensitivities to capture infrared light. In some embodiments, the first image acquisition device 202 may be a first monochrome camera and the second image acquisition device 204 may be a second monochrome camera. In some embodiments, the first image is a first monochrome image and the second image is a second monochrome image. The monochrome cameras may be configured to capture infrared light or visible light. The first image acquisition device 202 may be a first infrared camera and the second image acquisition device 204 may be a second infrared camera. The third image acquisition device 206 may be a context camera for acquiring a context image. In some embodiments, the third image acquisition device 206 is a color camera and the third image acquisition device 206 is configured to acquire at least one color context image.

In some embodiments, the APLR system comprises one or more illuminators 208. As shown in FIG. 11, the camera unit 302 may comprise one or more illuminators 208 for emitting light. In some embodiments, the illuminator(s) 208 may be external to the camera unit 302. The illuminator 208 may be a flash for one or more of the cameras 202, 204, 206. In some embodiments, the illuminator 208 may emit continuous light. In some embodiments, the illuminator 208 may emit light in synchronization with the capture of one or more images. The illuminator 208 may comprise one or more light emitting diodes (LEDs). Any other suitable light emitting source may be used for the illuminator 208. In some embodiments, the method 600 comprises activating the illuminator 208 to emit light. The processing unit 210 or 410 controls the activation and deactivation of the illuminator 208 to synchronize turning on and off the light emitted by the illuminator 208. In some embodiments, the processing unit 210 or 410 controls the activation and deactivation of the illuminator 208 such that at least one of the first image 502 and the second image 504 is acquired with light emitted from the illuminator 208. In some embodiments, the processing unit 210 or 410 controls the activation and deactivation of the illuminator 208 such that both the first image 502 and the second image 504 are acquired with light emitted from the illuminator 208. The license plate 104 may be retroreflective or may at least in part be retroreflective, and light may reflect off of the retroreflective parts of the license plate 104. The light emitted from the illuminator 208 may or may not be visible light, e.g., it may be infrared light or it may be visible light. In some embodiments, each camera 202, 204 may have its own illuminator, such as the illuminator 208. In some embodiments, the third camera 206 has an illuminator, such as the illuminator 208. In some embodiments, two or more illuminators may be provided where at least one of the illuminators is for emitting visible light and at least one of the illuminators is for emitting non-visible (e.g. infrared) light. In some embodiments, the camera unit 302 is the AutoVu™ SharpZ3 provided by Genetec Inc.

It should be appreciated that by having an accurate geographical location of the license plate 104 that this may allow for improved LPR and/or improve parking and/or vehicle enforcement/violation detection. Some examples that illustrate the possible improved LPR and/or possible improved parking and/or vehicle violation detection are further described below.

In some embodiments, the method 600 further comprises determining a geographical location of the vehicle 108 with the license plate 104 based on the geographical location of the license plate 104. For example, the context image of the vehicle 108 may be processed to determine vehicle information (e.g., one or more of make, model, and year of the vehicle 108). By way of another example, a database may be queried with the license plate number 106 of the vehicle 108 to obtain vehicle information (e.g., one or more of make, model, and year of the vehicle 104). Based on the obtained vehicle information, a database may be queried with the vehicle information to determine dimension information for the vehicle 108. The dimension information may comprise the length and width of the vehicle 108. The dimension information may be a 3D model of the vehicle 108. From the dimension information and the geographical location of the license plate 104, the geographical location of the vehicle 108 may be generated. For example, the geographical location of the front, back and sides of the vehicle 108 may be determined. The dimension information for the vehicle 108 may be estimated. The dimension information for the vehicle 108 may be determined from one or more images of the vehicle 108 or from information provided by one or more sensors. The geographical location of the vehicle 108 may be referred to as a geographical position of the vehicle 108 when the geographical location of the vehicle 108 comprises the dimension information for the vehicle 108. The geographical location (or position) of the vehicle 108 may be stored to memory, transmitted to an external system or device and/or displayed on a display device.

In some embodiments, a parking violation can be determined based on the geographical location (or position) of the vehicle 108. For example, based on the geographical location (or position) of the vehicle 108, it can be determined that the vehicle 108 is parked outside of an allowable parking area. The vehicle 108 may be parked outside of an allowable parking area when one or more of the following occurs: the vehicle 108 is mis-parked, parked in two parking spaces, parked in the middle of a parking space, parked over the line of a parking space, parked too close or too far from a curb, parked on a curb, parked in a non-parking area, etc. In some embodiments, the geographical location (or position) of the vehicle 108 may be compared to one or more geographical locations that correspond to allowable parking areas, and when the geographical location (or position) of the vehicle 108 does not correspond to a given allowable parking area (e.g., the vehicle 108 is not entirely positioned in a given allowable parking areas), the vehicle 108 is determined to be parked outside of the allowable parking area. In some embodiments, the geographical location (or position) of the vehicle 108 may be compared to one or more geographical locations that correspond to non-allowable parking areas. The vehicle 108 may be parked in a non-allowable parking area when one or more of the following occurs: the vehicle 108 is mis-parked, parked in two parking spaces, parked in the middle of a parking space, parked over the line of a parking space, parked too close or too far from a curb, parked on a curb, parked in a non-parking area, etc. When the geographical location (or position) of the vehicle 108 corresponds to a non-allowable parking area (e.g., the vehicle 108 is at least in part positioned in a non-allowable parking area), the vehicle 108 may be determined to be parked outside of the allowable parking area. When the vehicle 108 is determined to be parked outside of the allowable parking area, a parking violation may then be determined. When a parking violation is determined, a parking violation event may be generated. The parking violation event may comprise an image of the license plate 104 (e.g., one of the first or second images 502, 504), an image of the vehicle 108, the times that the image(s) were captured, and/or any other suitable information.

In some embodiments, the method 600 further comprises determining an area (e.g., a lane, a parking space, a reserved area, a reserved lane, an intersection, etc.) that the vehicle 108 is therein based on the geographical location of the license plate 104. By recording the number of vehicles in a certain area over a period of time (e.g., a day, an hour, etc.), statistics may be generated (e.g., lane usage—number of vehicles in a lane over a period of time; number of vehicles passing a certain point, peak number of vehicles, etc.). The statistics may be determined in real-time and may be displayed on a map shown on a display device.

In some embodiments, the method 600 further comprises determining that the vehicle 108 is in a prohibited area (e.g., a non-parking area, a prohibited lane, a reserved area, a reserved lane, stopped in an intersection, crossed a double line, etc.) based on the geographical location of the license plate 104. The geographical location of the license plate 104 may be compared to one or more geographical positions that correspond to a prohibited area, and when found to be in the prohibited area, a vehicle violation may be determined. When a vehicle violation is determined, a vehicle violation event may be generated. The vehicle violation event may comprise an image of the license plate 104 (e.g., one of the first or second images 502, 504), an image of the vehicle 108, the times that the image(s) were captured, and/or any other suitable information. Similarly, in some embodiments, the method 600 further comprises determining that the vehicle 108 is parked outside of an allowable parking area (e.g., mis-parked, parked in two parking spaced, parked in the middle of a parking space, parked over the line of a parking space, parked too close or too far from a curb, parked on a curb, parked in a non-parking area, etc.) based on the geographical location of the license plate 104. When it is determined that the vehicle 108 is parked outside of an allowable parking area, a vehicle violation may be determined and a vehicle violation event may be generated.

In some embodiments, the method 600 further comprises determining a parking space that the vehicle 108 is parked therein based on the geographical location of the license plate 104. The method 600 may comprise determining if the parking space that the vehicle 108 is parked therein requires a permit (e.g., a parking permit, a handicap permit, a special hours permit, etc.), comparing the license plate number 106 to a permit list of license plate numbers allowed to park in the parking space, and detecting a parking violation when the license plate number 106 is absent from the permit list. The method 600 may comprise determining whether payment for parking in the parking space has been made and/or whether a parking violation has occurred for failure to make payment for parking in the parking space. A parking database storing parking space identifiers and associated geographical locations may be queried with the geographical location of the license plate 104 (or vehicle 108) to obtain a parking space identifier of the parking space that the vehicle 108 is parked therein. A parking database storing parking space identifiers and associated parking payments may be queried with the parking space identifier to determine if payment has been made for parking in the parking space associated with the parking space identifier. Alternatively, a parking database storing parking space identifiers, associated geographical locations, and associated parking payments may be queried with the geographical location of the license plate 104 (or vehicle 108) to determine if payment for the parking space associated with the geographical location of the license plate 104 (or vehicle 108) has been made. The database(s) may be stored at the APLR system 100 (e.g., at the camera unit 302 and/or the external computer device 402) or may be stored by a remote computing device (e.g., a server). When payment has not been made, a parking violation may be detected and a parking violation event may be generated. The parking violation event may comprise an image of the license plate 104 (e.g., one of the first or second images 502, 504), an image of the vehicle 108, the time that the image of the license plate 104 was captured, and/or any other suitable information. The identified parking space may be shown on a map displayed on a display device and a graphical representation of the vehicle 108 may also be shown on the map relative to the parking space, which may allow an operator to identify if the vehicle 108 is violating a parking rule.

In some embodiments, the method 600 further comprises determining that the vehicle 108 with the license plate 104 has remained in the same geographical location for a period of time based on the geographical location of the license plate 104. The method 600 may also further comprise determining a parking violation when the period of time that the vehicle 108 remains in the same geographical location has exceeded a time limit for how long a vehicle may park at a given location. The current geographical location of the license plate 104 may be compared to a previously obtained geographical location of the license plate 104 to determine that the vehicle 108 has remained in the same geographical location. The amount of time that the vehicle 108 has remained in the same geographical location may be determined based on a different between the times that the current geographical location of the license plate 104 and the previously obtained geographical location of the license plate 104 where obtained. When the time difference exceeds the time limit, a parking violation may be detected and a parking violation event may be generated. The parking violation event may comprise images of the license plate 104, the times that the images of the license plate 104 were captured, and/or any other suitable information.

The parking violation event or vehicle violation event may be stored in memory, transmitted to a remote computing device (e.g., a server, portable computer, etc.), and/or used to print a ticket (e.g., a parking ticket). The determination for the parking and/or vehicle violation may be performed by the processing unit 210 of the camera unit 302 or of the external computing device 402, or may be performed at a remote computing device (e.g., a server, portable computer, etc.). For example, the geographical location of the license plate 104 may be transmitted to the remote computing device from the camera unit 302 or of the external computing device 402. Other information such as the images of the license plate 104 and/or context images may also be transmitted. The camera unit 302 or the external computing device 402 may then receive from remote computing device the parking and/or vehicle violation event. The camera unit 302 or the external computing device 402 may then add any suitable information to the violation event, for example, such as one or more license plate and/or context images, which then may be transmitted back to the remote computing device.

In some embodiments, the identification of a license plate number is based on a geographical location of the license plate with the license plate number. For example, a plurality of pairs of images of one or more license plates may be acquired with the cameras 202, 204 (i.e., each pair has a first image acquired with the first camera 202 and a second image acquired with the second camera 204), and each pair of images may be processed to determine a geographical location of a license plate captured by each pair of images. Based on the determined geographical locations of each pair of images, the images of the license plates may be grouped according to a common license plate or common vehicle. Based on the grouping of the license plate images, one or more images of the license plate in a group may be processed to identify the license plate number. In other words, the ALPR system 100 may be used to capture multiple license plate images of multiple different vehicles and by having the accurate geographical location of the license plates it can be determined which license plate images corresponds to which vehicle. For example, if two vehicles are parked closely to each other, the ALPR system 100 may obtain a plurality of license plate images of the first vehicle and a plurality of license plate images of the second vehicle. By having an accurate geographical location of the first license plate and an accurate geographical location of the second license plate, it can be determined which license plate images are associated to the first vehicle (or first license plate of the first vehicle) and which license plate images are associated to the second vehicle (or second license plate of the second vehicle). Accordingly, based on which vehicle (or plate) a plurality of license plate images are associated therewith, the license plate number may then be identified based on processing the plurality of license plate images associated with a give vehicle (or give license plate). This processing may include selecting one or more of the plurality of license plate images to identify the license plate number therein. The selection may be based on the quality of the images taken. Alternatively, this processing may include identifying the license plate number in each image, comparing the identified license plate numbers to each other, and then determining that the detected license plate number is the one most commonly identified. It should be appreciated that by being able to accurately determine which ones of multiple license plate images correspond to a same vehicle (or same plate) that this may reduce or eliminate the error of incorrectly identifying two different license plates numbers as being from two different vehicle when they in fact correspond to the same license plate of a same vehicle. Thus, by using the geographical location of license plates, this may indirectly improve the output of the OCR process for identifying license plate numbers.

In some embodiments, the method 600 may be modified to comprise: obtaining a plurality of pairs of images of at least one license plate, each pair of images in plurality of pairs of images comprising a first image acquired by the first image acquisition device 202 and a second image acquired by the second image acquisition device 204; determining a three-dimensional position of the license plate in each pair of images relative to the camera unit based on stereoscopic image processing of the first image and the second image in each pair of images; obtaining a geographical location of the camera unit for each pair of images; determining a geographical location of the license plate in each pair of images from the three-dimensional position of the license plate in each pair of images relative to the camera unit and the geographical location of the camera unit for each pair of images. The method 600 then may further comprise assigning each pair of images to one of one or more groups of license plate images based on the geographical location of the license plate in each pair of images. Each group of the one or more groups corresponds to license plate images where the license plate in each image in a respective group has substantially the same geographical location. The method 600 then may further comprise identifying a license plate number based on processing one or more of the license plate images in one group of the one or more groups of license plate images.

In some embodiments, the plurality of pairs of images comprises a first set of one or more pairs of images of a first license plate and a second set of one or more pairs of images of a second license plate different from the first license plate. In some embodiments, determining the three-dimensional position of the license plate in each pair of images relative to the camera unit comprises determining a three-dimensional position of the first license plate relative to the camera unit for each set in the first set and determining a three-dimensional position of the second license plate relative to the camera unit for each set in the second set. In some embodiments, obtaining a geographical location of the camera unit for each pair of images comprises obtaining a geographical location of the camera unit for each set in the first set and for each set in the second set. In some embodiments, determining a geographical location of the license plate in each pair of images comprises determining a geographical location of the first license plate for each set in the first set and determining a geographical location of the second license plate for each set in the second set. The geographical location of the first license plate for each set in the first set is determined from the three-dimensional position of the first license plate relative to the camera unit for each set in the first set and the geographical location of the camera unit for each set in the first set. The geographical location of the second license plate for each set in the second set is determined from the three-dimensional position of the second license plate relative to the camera unit for each set in the second set and the geographical location of the camera unit for each set in the second set. In some embodiments, assigning each pair of images to one of one or more groups of license plate images comprises assigning the pairs of images of the first set to a first group of license plate images based on the geographical location of the first license plate for each set in the first set and assigning the pairs of images of the second set to a second group of license plate images based on the geographical location of the second license plate for each set in the second set. The first group corresponds to license plate images where the license plate in each image in the first group has substantially a same first geographical location and the second group corresponds to license plate images where the license plate in each image in the second group has substantially a same second geographical location different from the first geographical location. In some embodiments identifying a license plate number based on processing one or more license plate images in one group of the one or more groups of license plate images comprises identifying a first license plate number for the first group based on processing one or more images of the first group. The method 600 may then further comprise identifying a second license plate number for the second group based on processing one or more images of the second group, where the second license plate number is different from the first license plate number. In some embodiments, the first set comprises at least two pairs of images of the first license plate. In some embodiments, the second set comprises at least two pairs of images of the second license plate.

Figure 12:
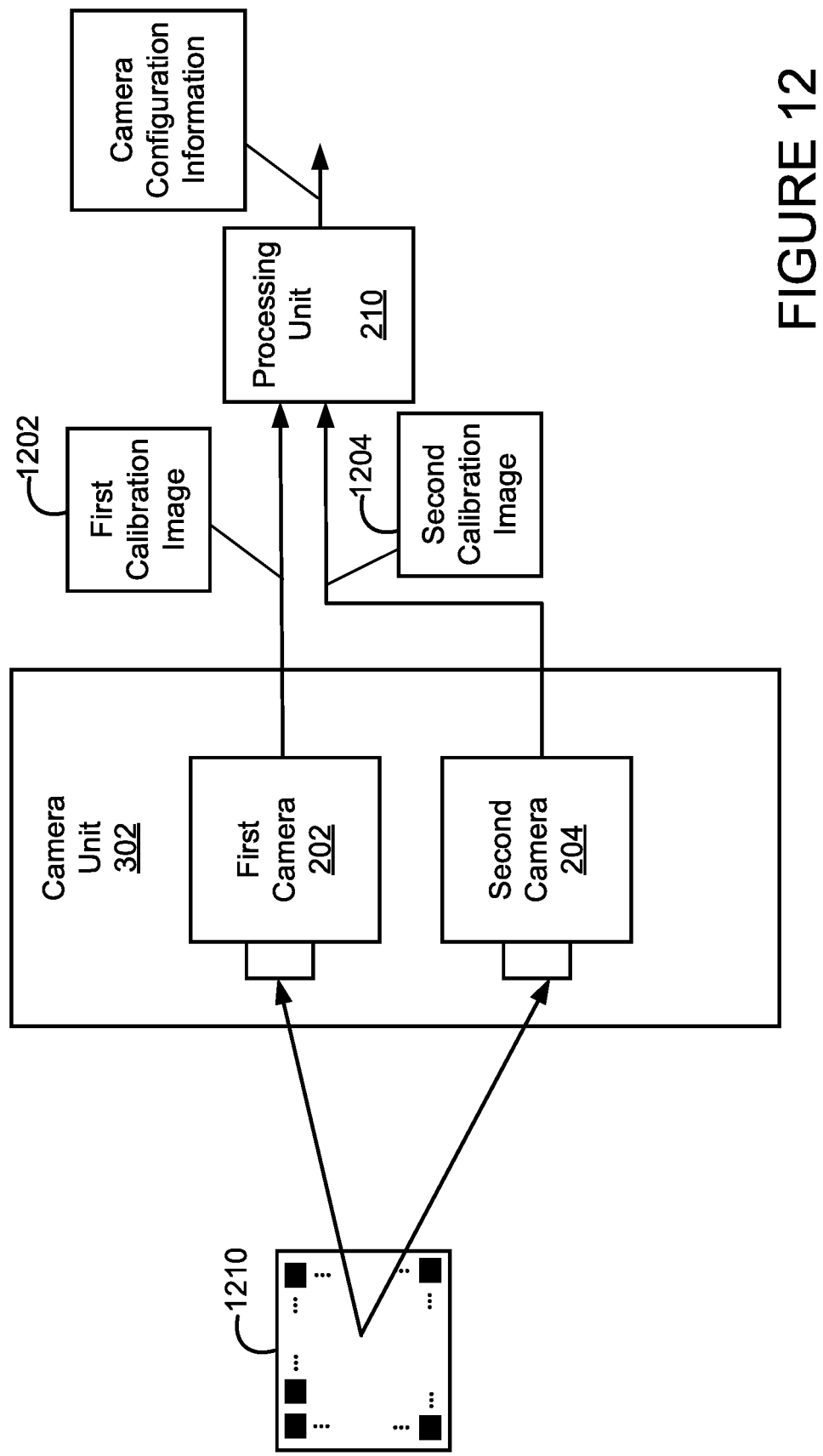
FIG. 12 is a block diagram illustrating a calibration process, in accordance with one or more embodiments.

With reference to FIG. 12, in some embodiments, it may be required to calibrate the cameras 202, 204 during camera production. The calibration may be done to determine the position, orientation, focal length and/or distortion of the cameras 202, 204. From this calibration process, the camera configuration information may be determined. As noted elsewhere in this document, the camera configuration information may be used for determining the 3D position of the license plate 104 relative to the camera unit 302. The camera configuration information may be used for other purposes. The camera configuration information may be referred to as calibration information. Calibration is implementation specific. For example, once the camera unit 302 is assembled, a calibration procedure may be run to determine the position and orientation of each optical sensor of the cameras 202, 204, and associated optics with respect to each other. The procedure may involve the use of a calibration object 1210 (e.g., a calibration panel), on which precisely located landmarks (i.e., markings on the calibration object 1210) are visible from both cameras 202, 204. That is, the calibration object 1210 may be positioned in front of the cameras 202, 204 at a known distance (referred to herein as the "calibration distance") from the cameras 202, 204. The specifications of the calibration object 120 (e.g., size, landmarks, calibration distance, etc.) may be known to the processing unit 210 (e.g., stored in the memory 212). The first camera 202 acquires at least a first calibration image 1202 of the calibration object 1210 and the second camera 204 at least a second calibration image 1204 of the calibration object 1210. The processing unit 210 or 410 obtains the first calibration image 1202 and the second calibration image 1204. The processing unit 210 or 410 obtains the specification information of the calibration object 120 (e.g., size, landmarks, calibration distance, etc.). The processing unit 210 or 410 determines the camera configuration information from the first calibration image 1202, the second calibration image 1204 and the specification information of the calibration object 1210. For example, the processing unit 210 or 410 may be configured to locate each landmark in both images 1202, 1204, and may compute a 3D model of the view of the world from each sensor of the cameras 202, 204. The parameters of this 3D model may then be written to memory 212 or 412 in the camera unit 302. The camera configuration information may comprise the parameters of this 3D model. The processing unit 210 or 410 stores the determined camera configuration information from the calibration process to memory 212 or 412. This calibration procedure may allow to overcome the small differences in sensor position and orientation that can be expected in the industrial production of camera-units, as a fraction of millimeter in position or a fraction of a degree in orientation can make a difference on how each sensor views the scene.

Figure 13:
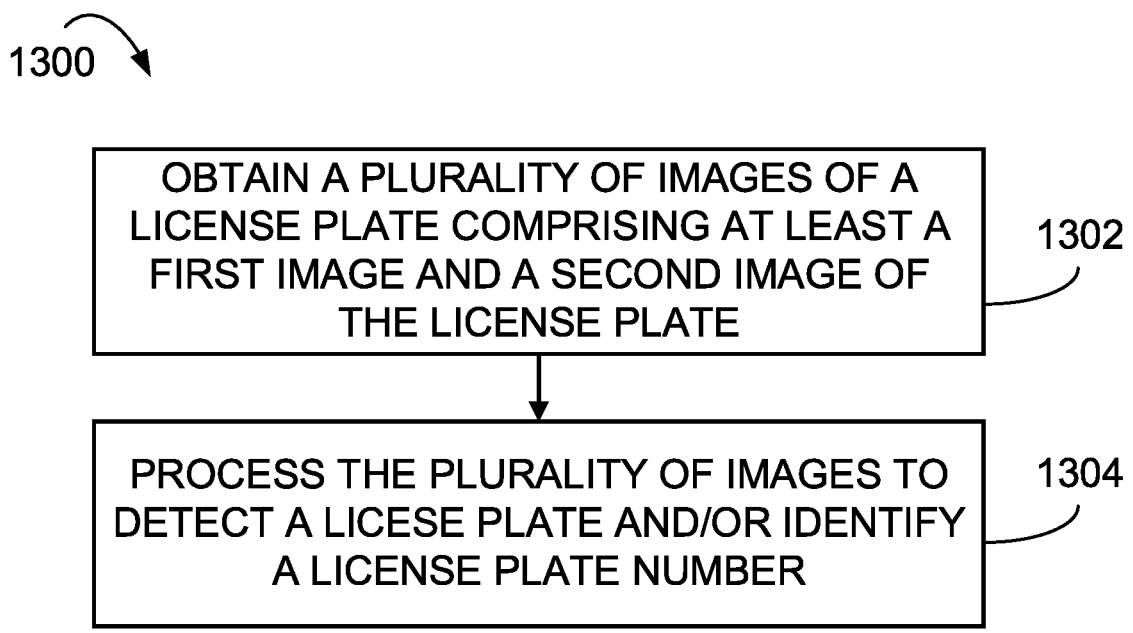
FIG. 13 is a flowchart illustrating an example method for detecting a license plate and/or identifying a license plate number, in accordance with one or more embodiments.

With reference to FIG. 13, there is shown a flowchart illustrating an example method 1300 for at least one of: (i) detecting a license plate; and (ii) identifying a license plate number. The method 1300 may be implemented in combination with the method 600 or may be implemented separate therefrom. The method 1300 may be implemented by an ALPR system, such as ALPR system 100. The steps of the method 1300 may be performed by the processing unit 210. Reference to the environment of FIG. 1 and/or the ALPR system 100 in the explanation of the method 1300 is for example purposes only. The method 1300 may be automatically performed when a vehicle 108 and/or a license plate 104 is detected by the ALPR system 100. The method 1300 may be performed in response to a command (e.g., from an operator in the patrol vehicle 108) to perform the method 1300.

At step 1302, a plurality of images of a license plate 104 are obtained. The plurality of images of the license plate 104 comprise at least a first image 502 of the license plate 104 acquired by a first image acquisition device 202 and a second image 504 of the license plate 104 acquired by a second image acquisition device 204. One or more of the plurality of images may be obtained from the memory 212. One or more of the plurality of images may be obtained from one or more of the image acquisition devices 202, 204, 206 and then stored to memory 212.

At step 1304, the plurality of images of the license plate 104 are processed to detect the license plate 104 in one or more of the plurality of images and/or to identify a license plate number 106 in one or more of the plurality of images. Step 1304 may comprise selecting one or more images from the plurality images based on the identifiability of the license plate 104 in the one or more image. Step 1304 may comprise selecting one or more images from the plurality images based on the identifiability of the license plate number 106 in the one or more image. The license plate number 106 may then be identified in the one or more images selected from the plurality images.

Figure 14:
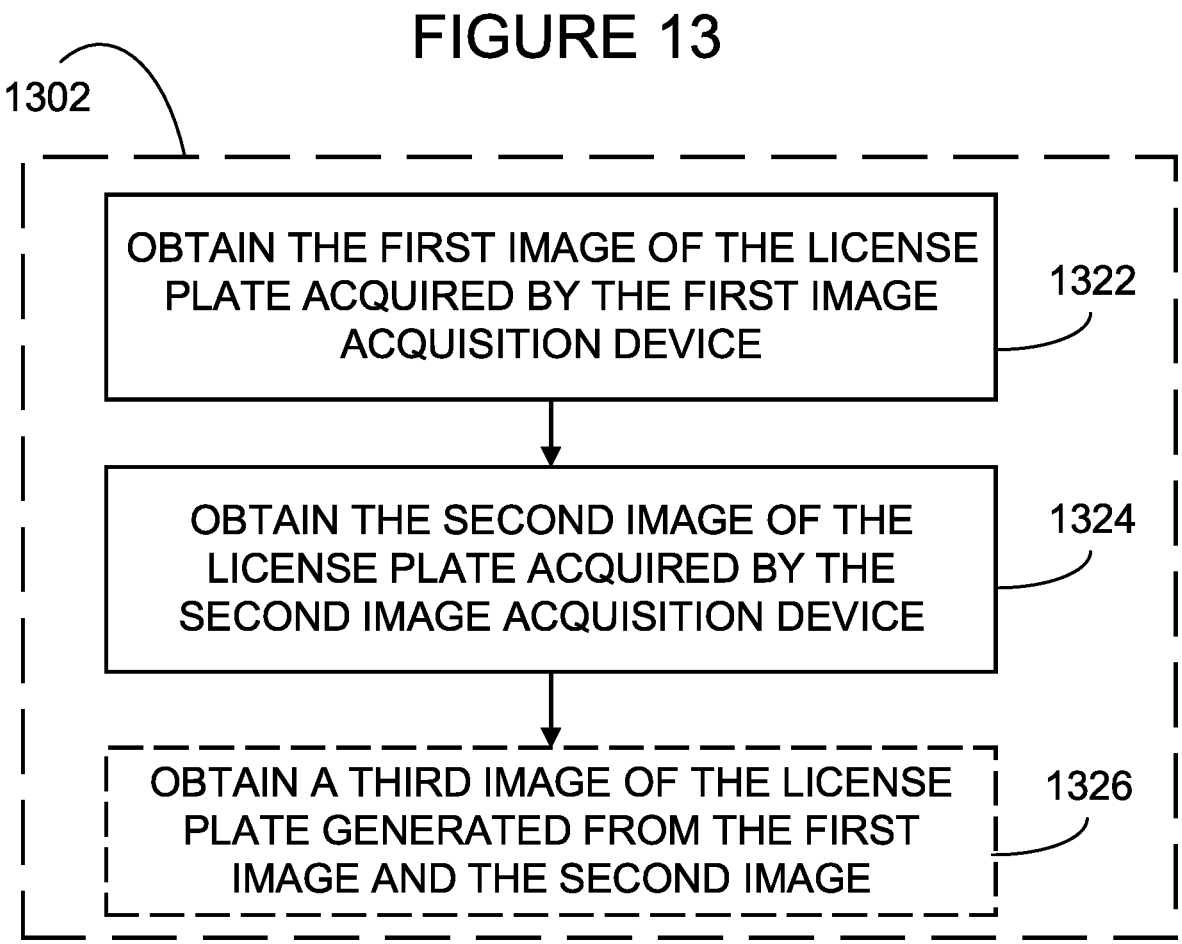
FIG. 14 is a flowchart illustrating an example of the step of obtaining a plurality of images of a license plate of the method of FIG. 13, in accordance with one or more embodiments.

With reference to FIG. 14, there is shown a flowchart illustrating an example for obtaining the plurality of image at step 1302 of the method 1300. Step 1322 comprises obtaining at least the first image 502 of the license plate 104 acquired by the first image acquisition device 202. Step 1324 comprises obtaining at least the second image 504 of the license plate 104 acquired by the second image acquisition device 204.

In some embodiments, the first image 502 is acquired by the first image acquisition device 202 at substantially the same time that the second image 504 is acquired by the second image acquisition device 204. By acquiring both the images 502, 504 at the same time, both of the images 502, 504 would capture the license plate 104 with slightly different fields of view. In some embodiments, the first image 502 and the second image 504 have substantially the same exposure level. In some embodiments, the first and second image acquisition devices 202, 204 may have the same (or similar) characteristics (e.g., one or more of: pixel count, light/wavelength sensitivity, same lenses, etc.). For example, in the case that stereoscopic image processing is performed on the first image 502 and the second image 504, the first and second images 502, 504 may be obtained at the same time, with the same exposure level, and the first and second image acquisition devices 202, 204 may be the same (or similar) types of cameras with the same (or similar) characteristics. In other cases, different exposure levels may be used for the stereoscopic image processing.

In some embodiments, the first image 502 and the second image 504 have different exposure levels. The first image acquisition device 202 may be configured with a first exposure setting and the second image acquisition device 204 may be configured with a second exposure setting. The first exposure setting and the second exposure setting may be different from each other. The exposure settings may be set such that the exposure level of the first image 502 is a multiplier (e.g., two-times, 2.5-times, ten-times, etc.) of the exposure level of the second image 504. The exposure settings may comprise setting the exposure time, gain, or both of the image acquisition devices 202, 204. The acquisition of the two images 502 and 504 can be done either in the same time range, or in partially overlapping time ranges, or in close but non-overlapping time ranges. The illuminator 208 may be triggered such that it is synchronized with either the acquisition time range of one of the two images 502 or 504. The illuminator 208 may alternatively be triggered during the overlapping time range where both images 502 and 504 are acquired. The illuminator 208 may alternatively be triggered during the time range where any of the images 502 and 504 are acquired.

The first image 502 and the second image 504 may be acquired over a common time range. That is, the aperture of the first image acquisition device 202 and the aperture of the second image acquisition device 204 may be controlled such that the apertures are at least in part open over a same period of time. For example, the image acquisition devices 202, 204 may open their apertures at substantially the same time and one of the image acquisition devices 202, 204 may close its aperture before the other. The illuminator 208 may be triggered simultaneously to emit light when the image acquisition devices, 202 204 are capturing the images 502, 504. That is, the illuminator 208 may be controlled to emit light over the period of time that both apertures are open. For example, the aperture of the first image acquisition device 202 may be configured to open for a first period of time $t_1$, the aperture of the second image acquisition device 202 may configured to open for a second period of time $t_2$, where the first period of time $t_1$ and the second period of time $t_2$ are at least in part overlapping (i.e., entirely overlapping or partially overlapping). The illuminator 208 may be controlled to emit light over at least the larger of the first period of time $t_1$ and the second period of time $t_2$ when the first period of time $t_1$ and the second period of time $t_2$ are entirely overlapping. When the first period of time $t_1$ and the second period of time $t_2$ are partially overlapping for a period of time $t_0$, the illuminator 208 may be controlled to emit light over the sum of the first period of time $t_1$ and the second period of time $t_2$ minus the overlapping period of time $t_0$ (i.e., $t_1+t_2-t_0$). By acquiring both the images 502, 504 where the apertures are open over an overlapping period of time, both of the images 502, 504 would capture the license plate 104 with slightly different fields of view and different exposure levels. The exposure times $t_1$, $t_2$ of the image acquisition devices 202, 204 may be set in different manners depending on practical implementation. When the first and second image acquisition devices 202, 204, are respectively set with the first and second exposure times $t_1$, $t_2$, the first and second image acquisition devices 202, 204 acquire the first and second images 502, 504 with the first and second exposure times $t_1$, $t_2$, respectively. The exposure gain may be controlled by acquiring the first image 502 with light emitted from the illuminator 208 and acquiring the second image 504 without or with less of the light emitted from the illuminator 208, or vice versa.

The exposure settings of the image acquisition devices 202, 204 may be set to capture different types of license plates. License plates may be made from a sheet of metal or hard plastic covered by a layer of retro-reflective compound. When exposed to a source of light, this compound reflects mainly in the direction which it came from, allowing a license plate to be more easily read from distance with a minimum of exposure light. There are two main types of license plates in North America: embossed and flat. For embossed plates, a metal sheet may be pressed so that each character under the compound is raised from the surrounding background. This ensures that characters are readable from a wider range of angles and a wider range of incident light. Some background designs are possible but limited. For flat plates, the characters may be printed directly on the compound with the desired color, which is then glued to a flat sheet of metal. More elaborate background designs are possible with this technique, but these plates are typically readable from only a narrow range of angles. They are also prone to over-illumination, when a higher lighting results in an image where the plate is too bright to be readable. Other than the flat/embossed construction, other factors change license plates' reflectivity. White-on-dark plates usually require more light or higher exposure to be readable than dark-on-white plates. Similarly, dirty or damaged license plates require a higher lighting than new, clean ones.

The first exposure setting may be set to a low exposure setting relative to the second exposure setting and the second exposure setting may be set to a high exposure setting relative to the first exposure setting. In other words, the first exposure setting may be lower than the second exposure setting and the second exposure setting may be higher than the first exposure setting. Accordingly, the first image 502 may be a low exposure image of the license plate 104 relative to the second image 504 and the second image 504 may be a high exposure image of the license plate 104 relative to first image 502. In other words, the first image has a lower exposure level than the second image 504 and the second image has a higher exposure level than the first image 502. In some embodiments, the first exposure setting of the first image acquisition device 202 may be set at a low exposure setting suitable for capturing retroreflective license plates and the second exposure setting of the second image acquisition device 204 may be set at a high exposure setting suitable for capturing non-retroreflective license plates. In some embodiments, the first exposure setting of the first image acquisition device 202 may be set at a low exposure setting suitable for capturing clean license plates and the second exposure setting of the second image acquisition device 204 may be set at a high exposure setting suitable for capturing dirty license plates. In some embodiments, the first exposure setting of the first image acquisition device 202 may be set at a low exposure setting suitable for capturing flat license plates and the second exposure setting of the second image acquisition device 204 may be set at a high exposure setting suitable for capturing embossed license plates.

In regards to detecting a license plate and/or identifying a license plate number, over-exposed images are generally more problematic than under-exposed ones. If the image is over-exposed, the information could be completely destroyed in the saturated part of the image. The plate is then completely unreadable, when it cannot be found. For under-exposed images, the license plate can usually be found, but reading it correctly is typically harder, producing results where some characters may be missing or misread. Trying to find and read plates in both a high-exposed and a low-exposed image are produced independently would typically double the processing time required, which may be too much processing for an embedded system using a low-power processor. A camera with a lower exposure setting typically has more of a chance to capture plates that are flat and a camera with a higher exposure setting typically has more of a chance to capture plates that are embossed or that are dirty. In other situations, if some license plates are retro-reflective and some license plates are not, the exposure of one camera can be set to a large multiple (e.g., 10-times) of the exposure of the other camera. The camera with lower exposure typically has more of a chance to capture the retro-reflective plates and the camera with the higher exposure typically has more of a chance to capture plates that are not retro-reflective. In yet other situations, one camera (e.g., camera 202) can be synchronized with the flash of the illuminator 208 and the other camera (e.g., camera 204) can be triggered out of sync of the flash of the illuminator 208 (and may be configured with higher exposure time or gain). The camera synchronized with flash typically has more of a chance to capture plates in good conditions. The camera that is not synchronized with the flash typically has more of a chance to capture plates that have damaged retro-reflective material.

In some embodiments, the image acquisition devices 202, 204 have different focal distances. For example, the first image acquisition device 202 may have a first focal distance suitable for capturing license plates at a first distance range (e.g., short range) and the second image acquisition device 204 may have a second focal distance suitable for capturing license plates at a second distance range (e.g., long range). This may allow for the better reading of small license plates and large license plates with the same ALPR system 100.

In some embodiments, step 1326 comprises obtaining a third image of the license plate 104 generated from the first image 502 and the second image 504. The third image may be generated from the first image 502 and the second image 504 in any suitable manner. The third image may be obtained from memory 212, in the case that third image has already been generated at the time of performance of step 1326. In some embodiments, step 1326 comprises generating the third image from the first and second images 502, 504, and storing the third image to memory 212.

Figure 15:
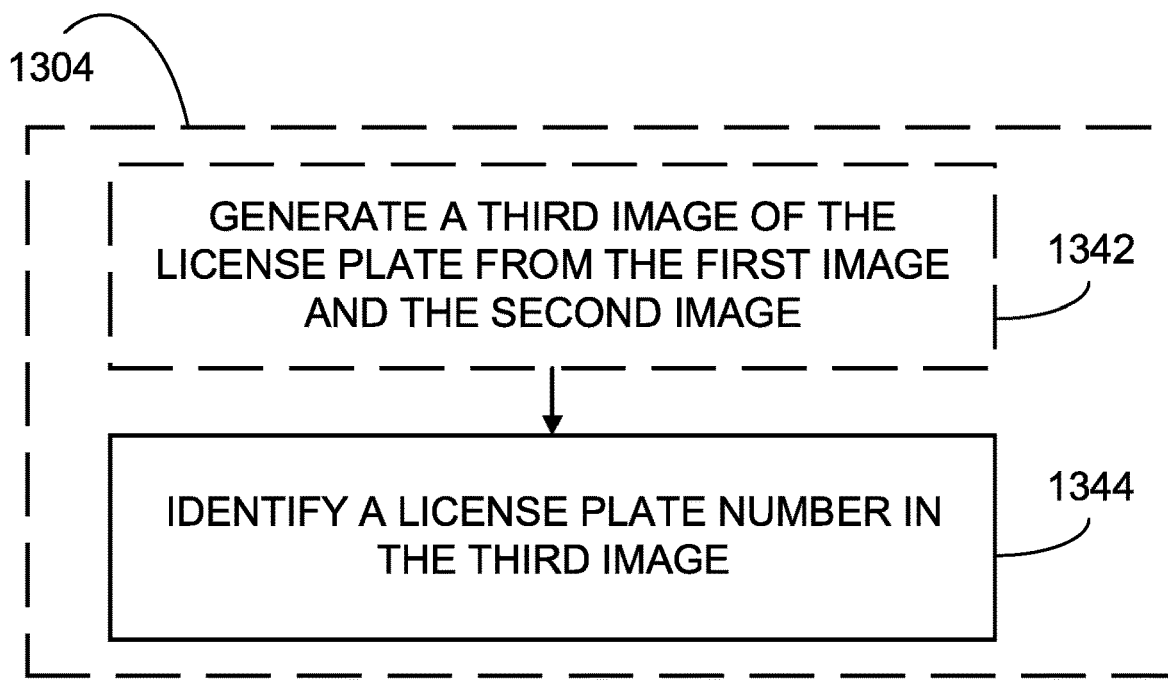
FIG. 15 is a flowchart illustrating an example of the step of processing the plurality of images of the method of FIG. 13, in accordance with one or more embodiments.

With reference to FIG. 15, there is shown a flowchart illustrating an example for processing the plurality of image at step 1304 of the method 1300. In some embodiments, at step 1342, a third image of the license plate 104 is generated from the first image 502 and the second image 504. The third image may be generated based on combining the first image 502 and the second image 504. The third image of the license plate 104 may be referred to as a composite image of the license plate, as it may be generated from combining the first and second images 502, 504 of the license plate 104.

The third image may be generated to at least in part to remove ambient light. An ambient light subtraction method may be performed to generated the third image. The ambient light subtraction method may be as described elsewhere in this document.

The third image may be a high dynamic range (HDR) image of the license plate 104. The HDR license plate image may be generated from the first and second images 502, 504, when these images 502, 504 have different exposure levels. In some embodiments, the first image 502 and the second image 504 are acquired by accordingly setting the first exposure setting and the second exposure setting of the first and second cameras 202, 204, respectively. In some embodiments, the first image 502 may be acquired with light emitted from the illuminator 208 and the second image 504 may be acquired without or with less of the light emitted from the illuminator 208. Accordingly, the two images 502, 504, one in sync and the other out of sync with the emitted light, may be used to generate the HDR image. The HDR license plate image may be generated by locating the license plate 104 in the first and second images 502, 504. Then, same-sized rectangular regions that encompass the license plate 104 in the images 502, 504 may be identified, where the rectangular regions have pixel dimensions smaller than the original images 502, 504. The license plate 104 may be aligned in one of the rectangular regions such that it corresponds to the location of the license plate 104 in the other one of the rectangular regions. The HDR license plate image may be generated from the rectangular regions and may thus have the same pixel dimensions as the rectangular regions.

The third image may be an exposure fusion image of the license plate 103 generated using exposure fusion, which is an image processing technique for blending multiple exposures into a single image. The exposure fusion image of the license plate 104 may be generated based on blending the first and second images 502, 504 without reconstructing a higher bit-depth. The exposure fusion image of the license plate 104 may be generated based on tone-mapping using the first and second images 502, 504.

The third image may be a high resolution image of the license plate 104 generated using a super-resolution algorithm. The high resolution license plate image may be generated from the first and second images 502, 504 using any suitable super-resolution algorithm. high resolution license plate image has a higher resolution than the first and second images 502, 504. The high resolution license plate image may be generated by locating the license plate 104 in the first and second images 502, 504. Then, same-sized rectangular regions that encompass the license plate 104 in the images 502, 504 may be identified, where the rectangular regions have pixel dimensions smaller than the original images 502, 504. The license plate 104 may be aligned in one of the rectangular regions such that it corresponds to the location of the license plate 104 in the other one of the rectangular regions. The high resolution license plate image may be generated from the rectangular regions but with larger pixel dimensions than the rectangular regions, to accommodate the increased resolution.

The third image may be a low noise image of the license plate 104 generated by averaging the pixel values of the images 502, 504. The low noise license plate image may be generated by locating the license plate 104 in the first and second images 502, 504. Then, same-sized rectangular regions that encompass the license plate 104 in the images 502, 504 may be identified, where the rectangular regions have pixel dimensions smaller than the original images 502, 504. The license plate 104 may be aligned in one of the rectangular regions such that it corresponds to the location of the license plate 104 in the other one of the rectangular regions. The low noise license plate image may be generated from the rectangular regions and may thus have the same pixel dimensions as the rectangular regions.

The third image may be a multiple band image where the first and second images 502, 504 are combined by forming pixels where the values of one band (e.g., red) of the third image are coming from the intensity values of the corresponding pixels in the first image 502 and the values of another band (e.g., green) are coming from the intensity values of the pixels in the second image 504.

The third image may be generated when it is suitable to do so. For example, the first and second images 502, 504 may be processed to determine the identifiability of the license plate 104 and/or license plate number 106 in each image 502, 504. If the license plate 104 and/or license plate number 106 is identifiable in both of the images 502, 504, then the third image may be generated. This may include identifying rectangular regions encompassing the license plate 104, and processing the rectangular regions to determine the identifiability of the license plate 104 and/or license plate number 106 in each of the rectangular regions. The images 502, 504 may be processed to assign to each image 502, 504 a confidence measure that the license plate 104 and/or license plate number 106 is identifiable in its respective image. The confidence measure may be a confidence score, which may be between 0% and 100%, where 0% indicates not confident that a license plate number can be accurately be identified and 100% indicates very confident that a license plate number can accurately be identified. In some embodiments, the exposure evaluator process may be implemented to determine the exposure quality levels of the license plates located in the images 502, 504. Based on the exposure quality level of a given image, a confidence score may be generated. For instance, an exposure quality level of 0 may be give a confidence score of 100%, an exposure quality level of +1 or −1 may be give a confidence score of 0%, and an exposure quality level value between 0 and +/−1 may linearly or non-linearly correspond to a value between 100% and 0%. In some embodiments, the confidence measure may correspond to the exposure quality levels. When the confidence measure of both images 502, 504 meets a certain criteria indicative that a license plate number 106 would likely be identifiable in a third image generated from the first and second images 502, 504, then the third image may be generated. For example, if the confidence score of each of the images 502, 504 is above a threshold (e.g., 60%, 70%, 80%, etc.), then the third image may be generated. By way of another example, if the absolute value of the confidence measure (e.g., exposure quality level value) is below a threshold (e.g., 0.3, 0.2, 0.1, etc.), then the third image may be generated.

The content of the first and second images 502, 504 may be aligned prior to generating the third image. The content of the images 502, 504 may be aligned to account for the slightly different fields of view of the cameras 202, 204. The alignment may be performed using a mapping between the pixel coordinates of the two cameras 202, 204 known from production. That is, a mapping of the pixel coordinates may be known from the camera configuration information. The mapping may comprise one or more displacement vectors that represent the displacement of the content in the images 502, 504. The mapping may be used to generate one or more displacement vectors that represent the displacement of the content in the images 502, 504. In some embodiments, a set of displacement vectors are determined, where each displacement vector in the set corresponds to a respective rectangular region in the images 502, 504. In some cases, the displacement between the image 502, 504 may be static in that it typically does not change and may be computed in advance during calibration, such as when the license plate 104 is at the calibration distance from the camera unit 302. However, typically, the displacement between the image 502, 504 would not be static. The displacement typically is dynamic and depends on where the license plate 106 is located in the images 502, 504. In some embodiments, the license plate 104 may be located in the first and second images 502, 504 prior to aligning these images 502, 504. One or more displacement vectors representing the displacement of the content (e.g., the license plate 104) in the images 502, 504 may be obtained. The displacement vector(s) may be generated based on the camera configuration information (or mapping). The displacement vector(s) may be generated based on the camera configuration information (or mapping) and the license plate 104 located in the in the images 502, 504. The displacement vector(s) may be obtained from memory 212 in cases where the displacement vector(s) were previously generated. Then, the displacement vector(s) are applied to pixels of either the first image 502 or the second image 504 in order to align the content. The alignment may be performed by applying the mapping (e.g., by applying one or more displacement vectors) to one of the first image 502 and the second image 504. The displacement vector(s) may be determined in a same or similar manner to that described in US Patent Application Publication No. US 2019/0244045, the contents of which are hereby incorporated by reference. In some embodiments, the alignment occurs on same-sized regions in each of the images 502, 504, rather than on the entire images 502, 504. For example, the license plate 104 may be located in respective same-sized rectangular regions in the images 502, 504, and then the license plate 104 may be aligned in one of the rectangular regions. Accordingly, the displacement vectors may be obtained for the rectangular regions rather than for the entire images 502, 504. In some embodiments, the alignment may comprise transforming and/or scaling the one or more of the images 502, 504, and/or one or more of the rectangular regions to account for the license plate 104 not being perpendicular to one or more the cameras 202, 204 when captured.

At step 1344, the license plate number 106 is identified in the third image. The identification of the license plate number 106 in an image may be as described elsewhere in this document. The license plate 104 may be located in the third image prior to identifying the license plate number 106.

Figure 16:
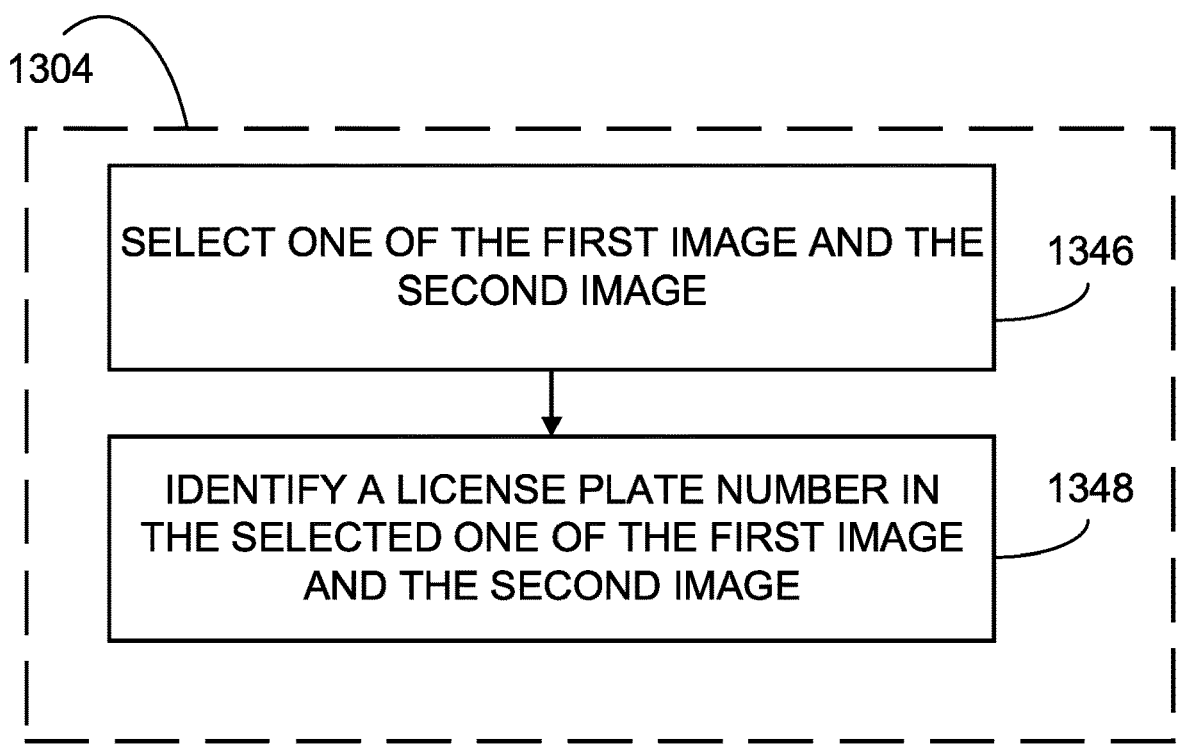
FIG. 16 is a flowchart illustrating another example of the step of processing the plurality of images of the method of FIG. 13, in accordance with one or more embodiments.

With reference to FIG. 16, there is shown a flowchart illustrating another example for processing the plurality of image at step 1304 of the method 1300. At step 1346, one of the first image 502 and the second image 504 of the license plate 104 is selected. The selection of the first image 502 and the second image 504 may be based on the identifiability of the license plate number in the images 502, 504. The identifiability may be determined from a confidence measure. Confidence measures for the images 502, 504, may be determined, for example, as described elsewhere in this document. The confidence measure may then be used to select one of the images 502, 504.

In some embodiments, the license plate 104 is located in the first image 502 and the second image 504. An exposure quality level of the located license plate 104 in each of the images 502, 504 may then be determined. The selection of the first image 502 and the second image 504 may then be based on the exposure quality level of the images 502, 504. The exposure quality level of the license plate is indicative of the license plate number 106 being identifiable in the images 502, 504. The exposure quality level may be on a scale of −1 to +1, where −1 corresponds to severely underexposed, 0 corresponds to correctly exposed, and +1 corresponds to severely overexposed. Accordingly, the exposure quality level between −1 and 0 generally corresponds to underexposed and the exposure quality level between 0 and +1 generally corresponds to overexposed. In some embodiments, the exposure quality level may be classified as one of: underexposed, correctly exposed, and overexposed. This process of determining the exposure quality may be referred to as an exposure evaluator process. The exposure evaluator process determines the exposure quality level based on the intensity values of the pixels of a license plate region corresponding to a license plate in a given image.

In some embodiments, the locating of a license plate in a given image is a two step process. Firstly, the whole image of the license plate may be processed to approximately locate the license plate in the given image, thereby providing an image region generally corresponding to the license plate. Secondly, when the license plate is detected in the given image, precise position of the license plate in the given image may be determined. The level of precision required may vary depending on the type of processing being performed. For example, generating an HDR image typically may require a higher level of precision than stereoscopic image processing of images to determine a license plate's geographical location. By way of another example, identifying a license plate number in a given image may have a lower level of precision than HDR image generation and stereoscopic image processing. The determining of the precise position of the license plate may include locating the corners of the license plate in the given image based on processing the image region that the license plate was approximately located therein. This second aspect may involve using regression, such as a license plate regressor trained based on machine or deep learning to locate a license plate in an image or image region. This aforementioned two-step process may be referred to as a plate finder process.

Figure 17:
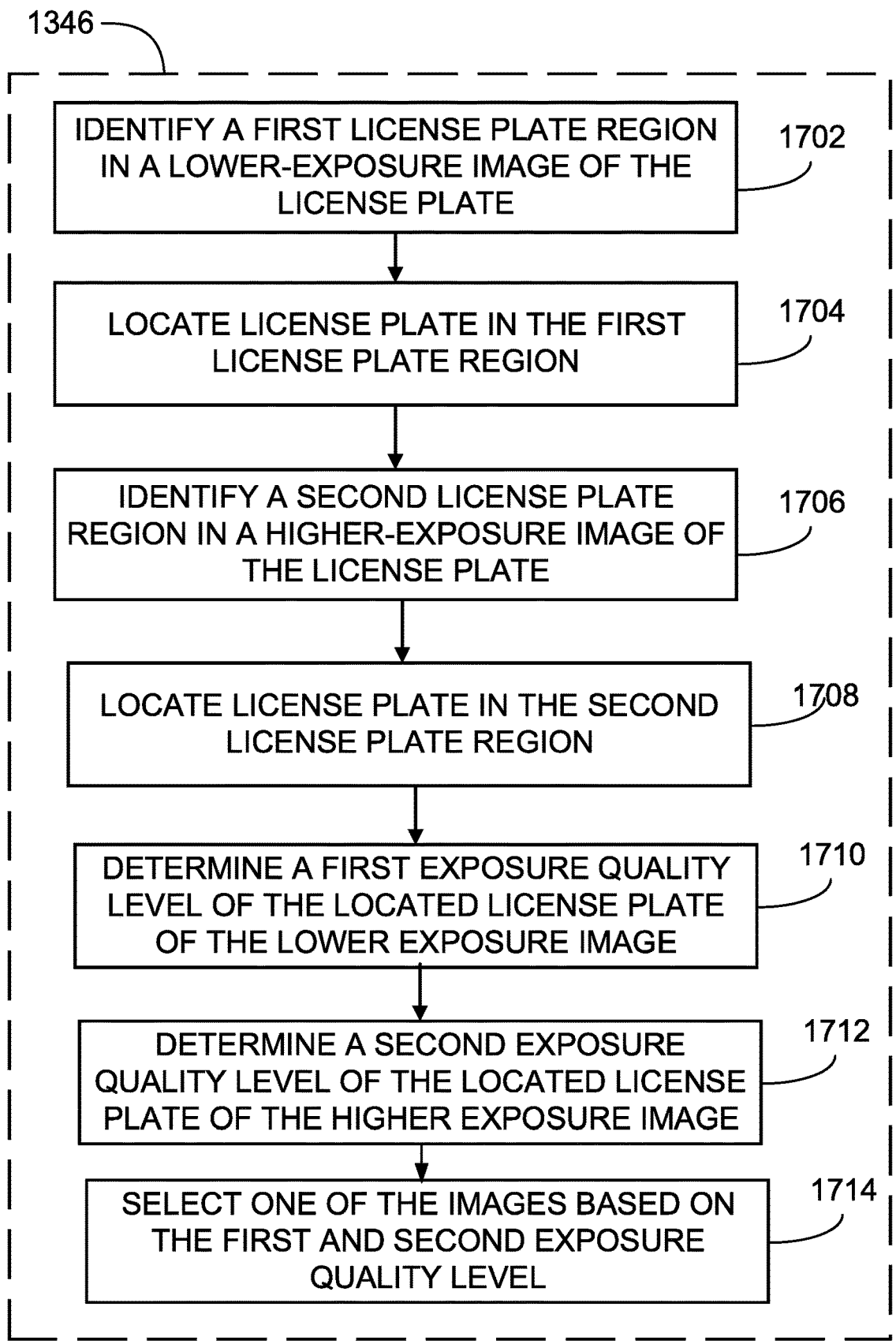
FIG. 17 is a flowchart illustrating an example of selecting an image of a step of FIG. 16, in accordance with one or more embodiments.

With additional reference to FIG. 17, there is shown a flowchart illustrating an example for selecting one of the images 502, 504 at step 1346 of FIG. 16. At step 1702, a first license plate region is identified in the lower-exposure image 502 of the license plate 104. The lower-exposure image is used in this example because it may be more likely to locate a license plate in an underexposed image than an overexposed image. The first license plate region corresponds to an approximate location of the license plate 104 in the first image 502. At step 1704, the license plate 104 is located in the first license plate region. This may include locating the corners of the license plate in the first license plate region. At step 1706, a second license plate region is identified in the higher-exposure image 504 of the license plate 104. The second license plate region corresponds to an approximate location of the license plate in the second image 504. The second license plate region may be found based on the first license plate region and the camera configuration information. This localization is approximative because the correspondence of cross-sensor image locations depends on the distance at which the plate is located. At step 1708, the license plate 104 is located in the second license plate region. This may include locating the corners of the license plate 104 in the second license plate region. At step 1710, a first exposure quality level of the license plate 104 located in first license plate region is determined. At step 1712, a second exposure quality level of the license plate 104 located in second license plate region is determined. At step 1714, one of the images 502, 504 is selected based on the first exposure quality level and the second exposure quality level. The first image 502 is selected when the exposure quality level of the license plate located in the first image 502 is better than the exposure quality level of the license plate located in the second image 502. The second image 504 is selected when the exposure quality level of the license plate located in the second image 504 is better than the exposure quality level of the license plate located in the first image 502. The exposure quality level of a license plate located in one image is considered better over the exposure quality level of a license plate located in another image when the exposure quality level is closest to a correctly exposed image. For example, when the exposure quality level is on a scale of −1 to +1, the absolute value of each exposure quality level of the license plate in the two images may be compared to each other and the image with the exposure quality level closest to a correctly exposed image or closest to zero (0) may be selected.

The determination of the exposure quality level of a license plate in an image may vary depending on practical implementations. The exposure quality level of the license plate of the first license plate region and the exposure quality level of the license plate of the second license plate region may be determined by the following example exposure evaluator process: A given license plate region may be processed to classify the license plate in the license plate region as one of: (i) a severely underexposed license plate; (ii) an underexposed license plate; (iii) an overexposed license plate; and (iv) a severely overexposed license plate. Based on the classification, the exposure quality level of the license plate within the license plate region may be determined. In this example classification, a severely underexposed license plate may have an exposure quality level between −1.0 and −0.5, a underexposed license plate may have an exposure quality level between −0.5 and 0, an overexposed license plate may have an exposure quality level between 0 and +1.0; and a severely overexposed license plate may have an exposure quality level of +1.0. The classification is determined based on the intensity values of the pixels of the license plate region. For example, if the images 502, 504 are gray scale monochrome images, then the intensity values correspond to gray levels. A gray level that a majority (e.g., 99%, 95%, 90%, etc.) of the pixel of the license plate region are below may be determined—this gray level is referred to as the "threshold gray level". A maximum gray level for the image acquisition device that captured the image may be obtained. The maximum gray level corresponds to the highest gray level that the sensor of the image acquisition device can output. A proportion of pixels whose gray level is above the maximum gray level optionally multiplied by a factor (e.g., 0.99, 0.95, 0.9, etc.) is determined—this proportion is referred to as the "light pixels proportion". A target for the light pixels proportion may be obtained—this target is referred to as the "target light pixels proportion". The target light pixels proportion may vary depending on the type of license plates being captured. For example, the target light pixels proportion may be a given value (e.g., 45%, 50%, 55% etc.) for a license plate having dark characters over a light background. By way of another example, the target light pixels proportion may be a given value (e.g., 15%, 20%, 25%, etc.) for a license plate having light characters over a dark background. When the threshold gray level is less than the maximum gray level, then the license plate may be classified as severely underexposed. Otherwise, when the light pixels proportion is greater than or equal to the target light pixels proportion multiplied by a factor (e.g., 1.5, 2, 2.5, etc.), then the license plate may be classified as severely overexposed. Otherwise, when the light pixels proportion is less than the target light pixels proportion, then the license plate may be classified as underexposed. Otherwise, when the light pixels proportion is greater than or equal to the target light pixels proportion and less than the target light pixels proportion multiplied by the aforementioned factor, then the license plate may be classified as overexposed. The exposure quality level of the severely underexposed license plate may be calculated as 0.5×the threshold gray level/maximum gray level−1.0. The exposure quality level of the underexposed license plate may be calculated as 0.5×the light pixels proportion/the target light pixels proportion−0.5. The exposure quality level of the overexposed light license plate may be calculated as the light pixels proportion/the target light pixels proportion−1.0. The exposure quality level of the severely overexposed license plate may be set to 1.0.

In some embodiments, an auto-exposure algorithm may be used to set the exposure setting for the cameras 202, 204. For instance, as license plates moves in front of the camera unit 302 and more reflective license plates alternate with less reflective ones, the image exposure may be continuously corrected. This is the role of the auto-exposure algorithm. It may be implemented using the exposure quality for each processed image that is provided by the exposure evaluator process to select which exposure level would likely be correct for the next frame. If the selected image was the one from the high-exposure sensor, the next exposure level for that sensor is determined using the corresponding image, while the exposure level of the low-exposure sensor is set to a fixed fraction of it. Conversely, if the selected image was the one from the low-exposure sensor, the next exposure level for that sensor is determined using the corresponding image, while the exposure level of the high-exposure sensor is set to a fixed multiple of it.

Referring back to FIG. 16, at step 1348, the license plate number 106 is identified in the selected image. The identification of a license plate number in an image may be as described elsewhere in this document. In some embodiments, the corners of license plate 104 located in the selected image may be used to extract a corresponding rectangle from the selected image to create a smaller image, containing only the license plate 104. The content in the smaller image may then be processed, for example, by isolating each character in the smaller image and applying many rules about license plate grammar that may be specific to different locations in order to identify the license plate number 106.

In some embodiments where the image acquisition devices 202, 204 have different focal distances, at step 1346, one of the first images 502 and second images 504 having different field of view (FOV) is selected for identifying the license plate number 106 therein. The FOV of one of the cameras (e.g., the second camera 204), having the longer focal lens, may be completely included in the FOV of the shorter focal lens of the other camera (e.g., the first camera 202). Accordingly, in this example, the first image 502 from the first camera 202 with the broader FOV may be processed to detect at least one candidate license plate. The approximate location of each candidate license plate in the second image 504 from the second camera 204 with the narrower FOV may be found using the camera configuration information from calibration and the location of the detected candidate license plate(s) in the first image 502. If none of those candidate license plates are completely found in second image 504 (i.e., included in the FOV of the second camera 204 with the narrower FOV), then the second image 502 is disregarded and the first image 502 from the first camera 202 with the broader FOV is selected. If there is a license plate candidate that is completely included in the second image 504 (i.e., in the FOV of the second camera 204 with the narrower FOV) and its size (in pixels) is below a threshold, then the second image 504 from the second camera 204 with the narrower FOV is selected. If there is a license plate candidate that is completely included in the second image 504 (i.e., in the FOV of the second camera 204 with the narrower FOV) and its size (in pixels) is above the threshold, the first image 502 from the first camera 202 with the broader FOV is selected. If no license plate candidates were found in the first image 502 from the first camera 202 with broader FOV, then the second image 504 from the second camera 204 with a narrower FOV is selected for identifying the license plate therein.

In some embodiments, the first image 502 may be acquired with light emitted from the illuminator 208 and the second image 504 may be acquired without or with less of the light emitted from the illuminator 208. Accordingly, at step 1346, one of the two images 502, 504, one in sync and the other out of sync with the emitted light, may be selected based on which one of the two images 502, 504 that the license plate is more identifiable therein (e.g., based on the exposure quality level of the license plate 104 in the images 502, 504).

Figure 18:
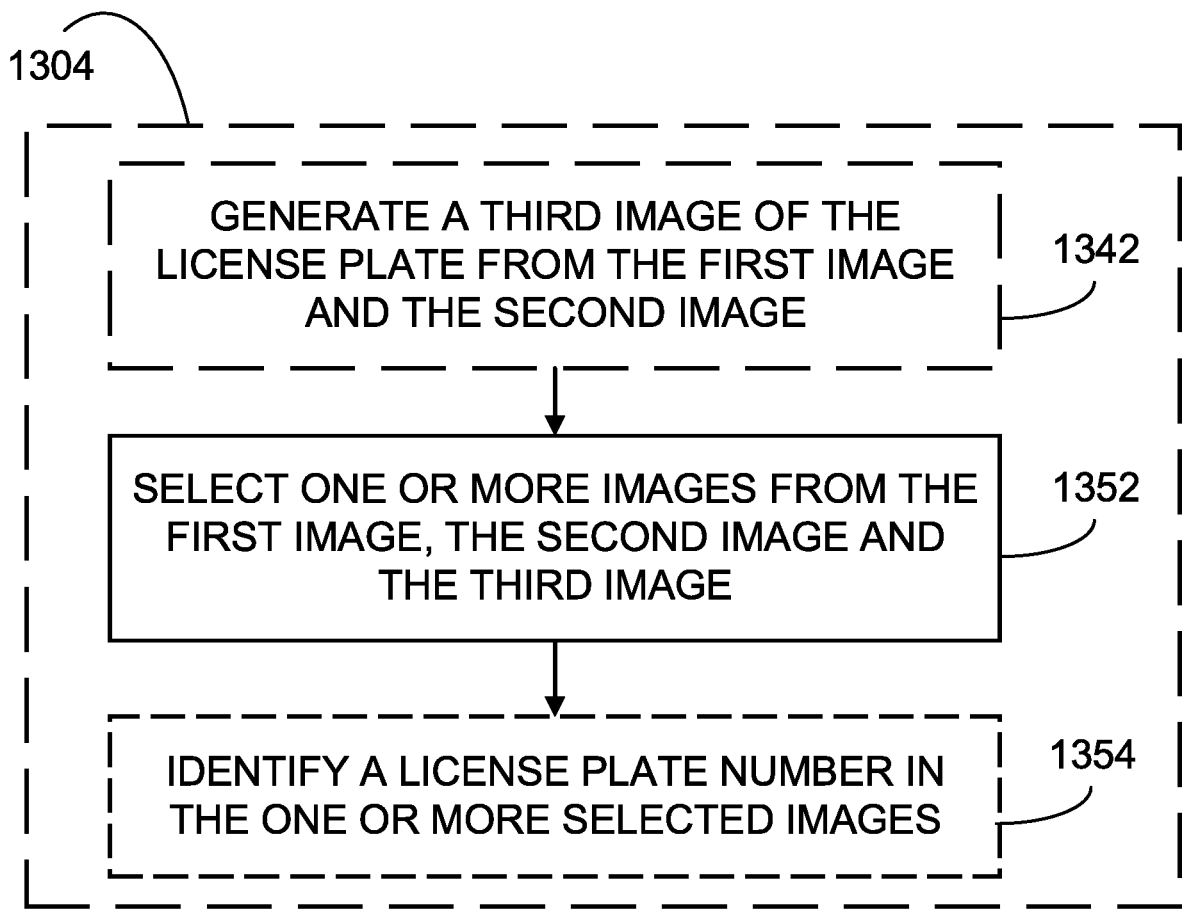
FIG. 18 is a flowchart illustrating yet another example of the step of processing the plurality of images of the method of FIG. 13, in accordance with one or more embodiments.

With reference to FIG. 18, there is shown a flowchart illustrating an example for processing the plurality of image at step 1304 of the method 1300. At step 1342, in some embodiments, a third image of the license plate 104 is generated from the first image 502 and the second image 504 of the license plate 104.

At step 1352, one or more images are selected from the plurality of images. Step 1352 may be implemented in a same or similar manner to step 1346 of FIG. 16. The plurality of images in this example comprise the first image 502, the second image 504, and the third image. The selection may be based on the identifiability of the license plate number in plurality of images. The plurality of images may be processed to assign to each image in the plurality a confidence measure that the license plate number is identifiable in its respective image. The confidence measure may be a confidence score, which may be between 0% and 100%, where 0% indicates not confident that a license plate number can be accurately be identified and 100% indicates very confident that a license plate number can accurately be identified. In some embodiments, the exposure evaluator process may be implemented to determine the exposure quality levels of the license plates located in the plurality of images. Based on the exposure quality level of a given image, a confidence score may be generated. For instance, an exposure quality level of 0 may be give a confidence score of 100%, an exposure quality level of +1 or −1 may be give a confidence score of 0%, and an exposure quality level value between 0 and +/−1 may linearly or non-linearly correspond to a value between 100% and 0%. In some embodiments, the confidence measure may correspond to the exposure quality level. Based on the confidence measure, one or more images are selected. For example, all images with a confidence score over a given threshold (e.g., 50%, 67%, 75%, etc.) may be selected. By way of another example, the image with the highest confidence score is selected. By way of yet another example, all images with the absolute value of their confidence measure (e.g., exposure quality level value) below a threshold (e.g., 0.3, 0.2, 0.1, etc.) may be selected. In another example, the one image with the lowest absolute value of it its confidence measure (e.g., exposure quality level value) may be selected. In some cases, only one of the images with be selected. In some cases, two image will be selected. In some cases, all three images may be selected.

At step 1354, the license plate number is identified in the one or more selected images. The identification of the license plate number in an image may be as described elsewhere in this document. In some embodiments, the characters of the license plater number identified in each of the selected images may be compared to make a determination as to the license plate number. In some embodiments, some characters of the license plater number may be identified in one image and other characters of the license plater number may be identified in another image.

The identified license plate number at step 1304 may be outputted in any suitable manner. For example, the identified license plate number may be stored to memory, transmitted to an external system or device and/or displayed on a display device. The identified license plate number may be associated with one or more images of the license plate 104 and/or vehicle 108, which may be stored to memory, transmitted to an external system or device and/or displayed on a display device.

The order of the steps of the methods described herein may vary depending on practical implementations and when suitable to change the order. Similarly, when suitable, the various steps of the methods described herein may be combined and/or omitted.

In some embodiments, the processing unit 210 may perform an ambient light subtraction method, such as described in US Patent Application Publication No. US 2019/0244045, the contents of which are hereby incorporated by reference. For example, the first image 502 may be acquired with light emitted from the illuminator 208 and the second image 504 may be acquired without or with less of the light emitted from the illuminator 208. The processing unit 210 controls the first camera 202, the second camera 204, and the illuminator 208 in order to synchronize light emission by the illuminator 208 with acquisition of the first image 502 and to acquire the second image 504 without or with less of the light emitted from the illuminator 208. The processing unit 210 may generated a compound image from the first image 502 and the second image 504. The processing unit 210 may generate the compound image by combining the first image 502 and the second image 504. For example, the compound image may be generated by subtracting the second image 504 from the first image 502, or vice versa. The processing unit 210 may align content of the first image 502 and the second image 504 prior to generating the compound image. The processing unit 210 may align the content of the first image 502 and the second image 504 based on static displacement and/or dynamic displacement of the content between the first image and the second image. The processing unit 210 may align the content of the first image 502 and the second image 504 by applying a mapping (e.g., by applying one or more displacement vectors) to the pixels of either the first image 502 or the second image 504. The mapping may be known from the camera configuration information. The displacement vector(s) represent displacement of the content between the first image 502 and the second image 504, including representing static displacement and/or dynamic displacement, of the content between the first image 502 and the second image 504. The displacement vector(s) may be obtained in any suitable manner, for example, obtained from memory 212 or generated accordingly. The license plate 104 may be detecting in the compound image and/or the license plate number may be identified in the compound image.

In some embodiments, part of the ALPR system 100 may be implemented on equipment on the patrol vehicle 102 and part of the ALPR system 100 may be implemented on equipment remote from the patrol vehicle. For example, any of the processing described herein as being performed by the processing unit 210, may be at least in part performed by one or more processing units of a remote computing device (e.g., one or more computers, a server, a server cluster, a mainframe, a computing cluster, a cloud computing system, a distributed computing system, a portable computing device, or the like). Accordingly, the camera unit 302 and/or external computing device 402 may transmit information (e.g., images of a license plate) to the remote computing device(s) for processing, which then returns information back (e.g., the geographical location of a license plate, a license plate number, etc.) to the camera unit 302 and/or external computing device 402.

In some embodiments, the first and second image acquisition devices 202, 204, are color cameras, and the third image acquisition device 206 is a monochrome camera and/or an infrared camera. In some embodiments, the first image acquisition device 202 is a monochrome and/or infrared camera and the second image acquisition device 204 is a color camera, or vice versa.

The camera unit 302 may comprise any suitable number of image acquisition devices. For example, the camera unit 302 may comprise more than two image acquisition devices for capturing images of license plates. By way of another example, the camera unit 302 may comprise more than one image acquisition device for capturing vehicles and context information.

It should be appreciated that the methods and/or systems described herein may allow for improved detection of the location of the license plate in one or more images and/or improved identification of the license plate number in one or more images.

The ALPR system 100 may be used for parking enforcement to determine parking violations, such as described in US Patent Application Publication No. US 2018/0350229, the contents of which are hereby incorporated by reference. For example, a first geographical location of the license plate 104 at a first time may be compared to a second geographical location of the license plate 104 at a second time, to determine if the vehicle 108 has moved or not. The first and second geographical location of the license plate 104 may be obtained in any suitable manner. For instance, the processing unit 210 may have determined both the first and second geographical location of the license plate 104. Alternatively, the processing unit 210 may have received the first geographical location of the license plate 104 from a remote computing device (e.g., a server, another external computing device and/or camera unit, etc.) and have determined the second geographical location of the license plate 104. In some embodiments, an external computing device may receive the first and second geographical location of the license plate 104 and determine if a parking violation has occurred. The vehicle 108 may be determined to have not moved (i.e., remained in the same spot) when the first geographical location of the license plate 104 corresponds to the second geographical location of the license plate 104. The first geographical location of the license plate 104 may correspond to the second geographical location of the license plate 104 when a different between the first geographical location and the second geographical location is less than a threshold. When the vehicle 108 is determined to have not moved, a time difference between the first time and the second time may be determined. The time difference may be compared to a time limit. The time limit may be specific to the geographical location of the vehicle 108. The time limit may be obtained based on either one of the first or second geographical location of the license plate 104. When the time difference exceeds the time limit, a parking violation may be determined. The parking violation event may be generated when a parking violation occurs, and may be stored in memory, transmitted to a remote computing device (e.g., a server, portable computer, etc.), and/or used to print a parking ticket.

The methods and systems described herein may be used for determining a geographical location of an object. Similarly, the methods and systems described herein may be used for detecting an object and/or identifying at least one feature of an object. The object may be a license plate and the feature may be a license plate number. Thus, the term "license plate" used herein may be interchanged with "object" and the term "license plate number" used herein may be interchanged with "feature". By way of an example, the object may be a sign (e.g., traffic sign, street sign, or the like) and the feature may be the information conveyed by the sign. By way of another example, the object may be a vehicle and the feature may be one or more parts or elements of the vehicle.

Figure 19:
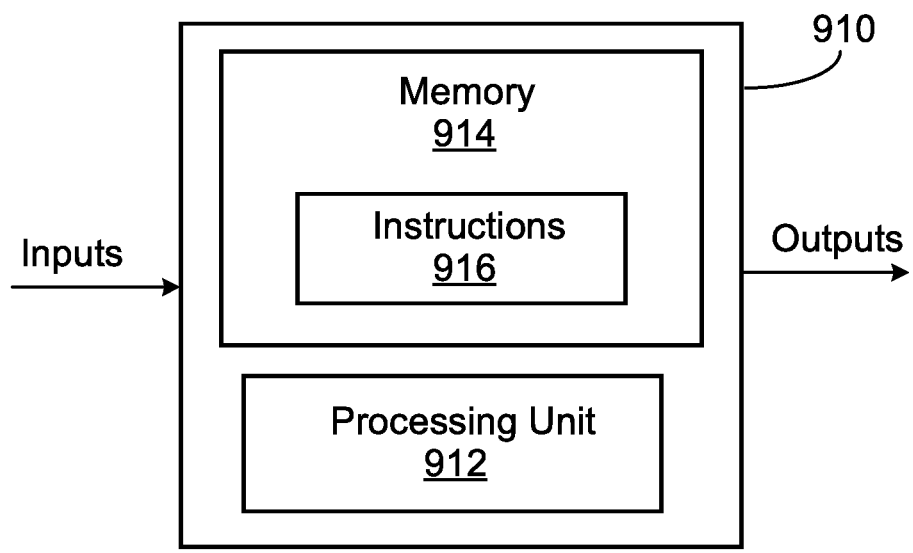
FIG. 19 is a schematic diagram of an example computing device, in accordance with one embodiment.

With reference to FIG. 19, the method(s) 600 and/or 1300, may be implemented by at least one computing device 910, comprising at least one processing unit 912 and at least one memory 914 which has stored therein computer-executable instructions 916. The camera unit 302 may comprise one or more computing device, such as the computing device 910. The computing device 402 may be implemented by the computing device 910. The processing unit 210 and the memory 212 may respectively correspond to the processing unit 912 and the memory 914 described herein. The processing unit 410 and the memory 412 may respectively correspond to the processing unit 912 and the memory 914 described herein. The positioning unit 510 may comprise one or more processing units, such as the processing unit 912, and/or one or more memory, such as the memory 914. The computing device 910 may comprise any suitable devices configured to implement the method(s) 600 and/or 1300 such that instructions 916, when executed by the computing device 910 or other programmable apparatus, may cause the functions/acts/steps performed as part of the method(s) 600 and/or 1300 as described herein to be executed. The processing unit 912 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof.

The memory 914 may comprise any suitable known or other machine-readable storage medium. The memory 914 may comprise non-transitory computer readable storage medium, for example, but not limited to, an electronic, magnetic, optical, electromagnetic, infrared, or semiconductor system, apparatus, or device, or any suitable combination of the foregoing. The memory 914 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 914 may comprise any storage means (e.g., storage devices) suitable for retrievably storing machine-readable instructions 916 executable by processing unit 912.

The methods and systems described herein may be implemented in a high level procedural or object oriented programming or scripting language, or a combination thereof, to communicate with or assist in the operation of a computer system, for example the computing device 910. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 912 of the computing device 910, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. An automated license plate recognition system comprising:
    a camera unit comprising:
        a first image acquisition device for acquiring at least a first image of a license plate; and
        a second image acquisition device for acquiring at least a second image of the license plate;
    at least one processing unit; and
    at least one non-transitory computer-readable memory having stored thereon program instructions executable by the at least one processing unit for:
        obtaining the first image and the second image of the license plate;
        determining a three-dimensional position of the license plate relative to the camera unit based on stereoscopic image processing of the first image and the second image, wherein determining the three-dimensional position of the license plate comprises:
            determining a difference of pixel coordinates of the license plate in the first image and the second image; and
            determining the three-dimensional position of the license plate based on the difference of the pixel coordinates and configuration information of the first image acquisition device and the second image acquisition device;
        obtaining a geographical location of the camera unit;
        determining a geographical location of the license plate from the three-dimensional position of the license plate relative to the camera unit and the geographical location of the camera unit; and
        outputting the geographical location of the license plate.

2. The system of claim 1, wherein determining the three-dimensional position of the license plate comprises:
    locating the license plate in the first image and the second image; and
    determining the three-dimensional position of the license plate based on the license plate located in the first image and the second image.

3. The system of claim 2, wherein locating the license plate in the first image and the second image comprises:
    identifying the pixel coordinates of the license plate in the first image and the second image.

4. The system of claim 3, wherein identifying the pixel coordinates of the license plate in the first image and the second image comprises locating the pixel coordinates of at least one corner of the license plate in the first image and the second image.

5. The system of claim 1, wherein obtaining the geographical location of the camera unit comprises determining the geographical location of the camera unit based on at least one of:

real-time kinematic processing of GPS signals received at one or more antennas, an orientation of the camera unit relative to the one or more antennas and a position of the camera unit relative to the one or more antennas, a previous known geographical location of the camera unit and dead-reckoning information, and interpolation from two geographical coordinates indicative of the geographical location of the camera unit.

6. The system of claim 1, further comprising a positioning unit for determining the geographical location of the camera unit, and wherein obtaining the geographical location of the camera unit comprises receiving the geographical location of the camera unit from the positioning unit.

7. The system of claim 6, wherein the geographical location of the camera unit is determined based on real-time kinematic processing of GPS signals received at one or more antennas connected to the positioning unit, an orientation of the camera unit relative to the one or more antennas and a position of the camera unit relative to the one or more antennas.

8. The system of claim 6, wherein the geographical location of the camera unit is determined based on a previous known geographical location of the camera unit and dead-reckoning information.

9. The system of claim 6, wherein the geographical location of the camera unit is determined based on interpolation from two geographical coordinates indicative of the geographical location of camera unit.

10. The system of claim 1, wherein the first image acquisition device is a first monochrome camera, the second image acquisition device is a second monochrome camera, the first camera and the second camera having substantially a same wavelength sensitivity, the first image is a first monochrome image, and the second image is a second monochrome image.

11. The system of claim 1, wherein the camera unit further comprises the at least one processing unit and the at least one non-transitory computer-readable memory.

12. The system of claim 1, wherein the system further comprises an external computing device in communication with the camera unit, the external computing device comprising the at least one processing unit and the at least one non-transitory computer-readable memory.

13. The system of claim 1, wherein the program instructions are further executable by the at least one processing unit for:
determining an exposure quality level of the license plate in the first image and the second image;
selecting one of the first image and the second image based on the exposure quality level of the license plate in the first image and the second image; and
identifying the license plate number in the selected one of the first image and the second image.

14. A computer-implemented method for determining a geographical location of a license plate, the method comprising:
obtaining a first image and a second image of a license plate, the first image acquired by a first image acquisition device of a camera unit and the second image acquired by a second image acquisition device of the camera unit;
determining a three-dimensional position of the license plate relative to the camera unit based on stereoscopic image processing of the first image and the second image, wherein determining the three-dimensional position of the license comprises:
determining a difference of pixel coordinates of the license plate in the first image and the second image; and
determining the three-dimensional position of the license plate based on the difference of the pixel coordinates and configuration information of the first image acquisition device and the second image acquisition device;
obtaining a geographical location of the camera unit;
determining a geographical location of the license plate from the three-dimensional position of the license plate relative to the camera unit and the geographical location of the camera unit; and
outputting the geographical location of the license plate.

15. The method of claim 14, wherein determining the three-dimensional position of the license plate comprises:
locating the license plate in the first image and the second image; and
determining the three-dimensional position of the license plate based on the license plate located in the first image and the second image.

16. The method of claim 15, wherein locating the license plate in the first image and the second image comprises:
identifying the pixel coordinates of the license plate in the first image and the second image.

17. The method of claim 16, wherein identifying the pixel coordinates of the license plate in the first image and the second image comprises locating the pixel coordinates of at least one corner of the license plate in the first image and the second image.

18. The method of claim 14, wherein obtaining the geographical location of the camera unit comprises determining the geographical location of the camera unit based on real-time kinematic processing of GPS signals received at one or more antennas, an orientation of the camera unit relative to the one or more antennas and a position of the camera unit relative to the one or more antennas.

19. The method of claim 14, wherein obtaining the geographical location of the camera unit comprises determining the geographical location of the camera unit based on a previous known geographical location of the camera unit and dead-reckoning information.

20. The method of claim 14, wherein obtaining the geographical location of the camera unit comprises determining the geographical location of the camera unit based on interpolation from two geographical coordinates indicative of the geographical location of camera unit.

* * * * *